US009947959B2

(12) United States Patent
Nakamura et al.

(10) Patent No.: US 9,947,959 B2
(45) Date of Patent: Apr. 17, 2018

(54) NON-AQUEOUS ELECTROLYTE BATTERY HAVING POROUS POLYMER LAYER BETWEEN LAMINATE FILM AND BATTERY DEVICE

(75) Inventors: Tomoyuki Nakamura, Fukushima (JP); Hiroshi Takabayashi, Fukushima (JP); Kunihiko Hayashi, Koriyama (JP); Yosuke Konishi, Koriyama (JP); Tetsuya Makino, Fukushima (JP)

(73) Assignee: Murata Manufacturing Co., Ltd., Kyoto (JP)

(*) Notice: Subject to any disclaimer, the term of this patent is extended or adjusted under 35 U.S.C. 154(b) by 826 days.

(21) Appl. No.: 13/290,709

(22) Filed: Nov. 7, 2011

(65) Prior Publication Data

US 2012/0121967 A1   May 17, 2012

(30) Foreign Application Priority Data

Nov. 17, 2010   (JP) .................................. 2010-257348

(51) Int. Cl.
*H01M 2/02* (2006.01)
*H01M 10/05* (2010.01)

(52) U.S. Cl.
CPC ........... *H01M 10/05* (2013.01); *H01M 2/026* (2013.01); *H01M 2/0287* (2013.01); *H01M 2220/30* (2013.01)

(58) Field of Classification Search
CPC .. H01M 2/0207; H01M 2/021; H01M 2/0277; H01M 10/0468; H01M 10/0459
(Continued)

(56) References Cited

U.S. PATENT DOCUMENTS 7,097,941 B1 * 8/2006 Hatazawa ............ H01M 4/623
429/217
2003/0064284 A1   4/2003 Yoshida et al.
(Continued)

FOREIGN PATENT DOCUMENTS

CN           1953268        4/2007
JP        2002-198099       7/2002
(Continued)

OTHER PUBLICATIONS

Japan Patent Office, Grounds for refusal notice issued in connection with Japanese Patent Application Serial No. 2010-257348, dated Apr. 8, 2014. (5 pages).
(Continued)

*Primary Examiner* — Maria Laios
(74) *Attorney, Agent, or Firm* — K&L Gates LLP

(57) ABSTRACT

A non-aqueous electrolyte battery includes a battery device in which a positive electrode is faced to negative electrode through a separator; a non-aqueous electrolyte; a laminate film which is formed by laminating a metal layer, an outside resin layer formed in outer face of the metal layer, and an inside resin layer formed in the metal layer, and in which the battery device and the non-aqueous electrolyte is packaged by heat welding and housed; a positive electrode lead which is electrically connected to the positive electrode, and drawn from portion heat-welded of the laminate film to an exterior thereof; a negative electrode lead which is electrically connected to the negative electrode, and drawn from portion heat-welded of the laminate film to an exterior thereof; and a porous polymer layer containing, as a component, vinylidene fluoride formed between the laminate film and the battery device.

18 Claims, 17 Drawing Sheets

(58) Field of Classification Search
USPC .................................. 429/246, 186, 162, 129
See application file for complete search history.

(56) References Cited

U.S. PATENT DOCUMENTS

| | | | |
|---|---|---|---|
| 2003/0134186 A1* | 7/2003 | Shizuki ............. | H01M 10/0525 429/94 |
| 2003/0170533 A1* | 9/2003 | Airey ................ | H01M 10/0413 429/128 |
| 2003/0215702 A1* | 11/2003 | Tanjou et al. ................. | 429/127 |
| 2004/0241550 A1* | 12/2004 | Wensley ............... | H01M 2/145 429/247 |
| 2005/0048361 A1* | 3/2005 | Wang ...................... | H01M 2/26 429/130 |
| 2006/0088762 A1* | 4/2006 | Okamoto ...................... | 429/142 |
| 2007/0077485 A1* | 4/2007 | Takamura ........... | H01M 2/0255 429/82 |
| 2007/0154787 A1* | 7/2007 | Jang ...................... | H01M 2/046 429/94 |
| 2007/0231702 A1* | 10/2007 | Fujita et al. .................. | 429/247 |
| 2008/0286635 A1* | 11/2008 | Seino et al. ..................... | 429/94 |
| 2009/0191462 A1* | 7/2009 | Matsui .................... | C01B 31/04 429/231.8 |
| 2010/0279161 A1* | 11/2010 | Kang et al. ..................... | 429/94 |

FOREIGN PATENT DOCUMENTS

| | | | |
|---|---|---|---|
| JP | 2002-305032 | | 10/2002 |
| JP | 2002305032 A | * | 10/2002 |
| JP | 2003-257387 | | 9/2003 |
| JP | 2003-109667 | | 11/2003 |
| JP | 2004-241328 | | 8/2004 |
| JP | 2005-056672 | | 3/2005 |
| JP | 2006-120462 | | 5/2006 |
| JP | 2006-134604 | | 5/2006 |
| JP | 2007-087652 | | 4/2007 |
| JP | 2009-043442 | | 2/2009 |
| KR | 20080112653 A | * | 12/2008 |

OTHER PUBLICATIONS

Japanese Office Action dated Aug. 19, 2014, for correesponding Japanese Appln. No. 2010-257348.
Notification of the First Office Action issued in connection with Chinese Patent Application No. 201110355362.9, dated Nov. 17, 2014. (18 pages).

* cited by examiner

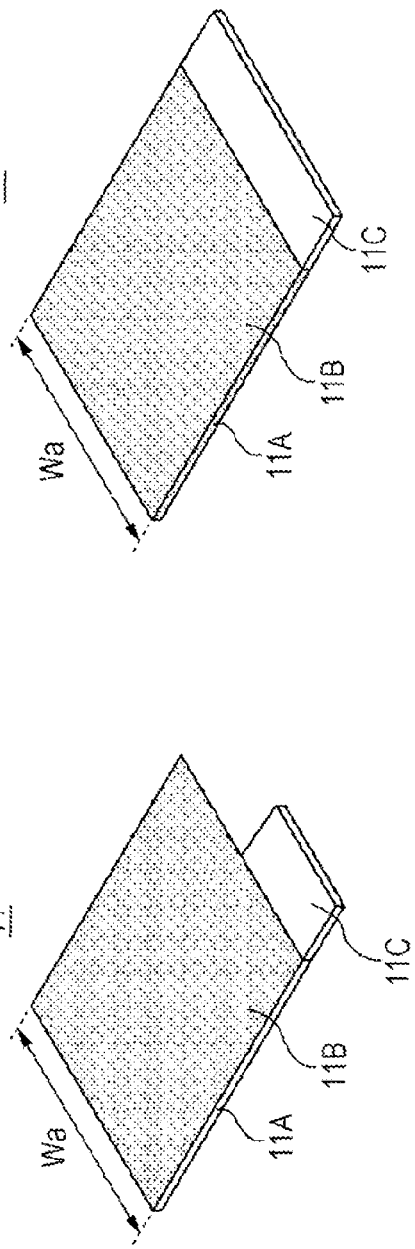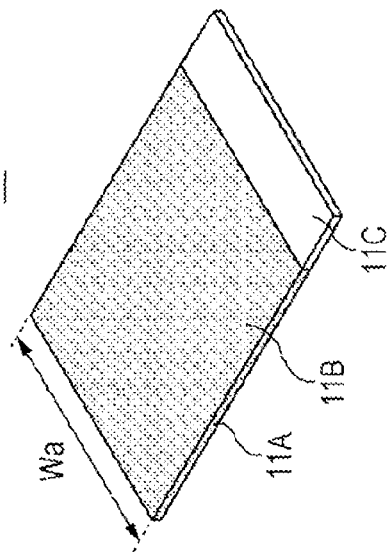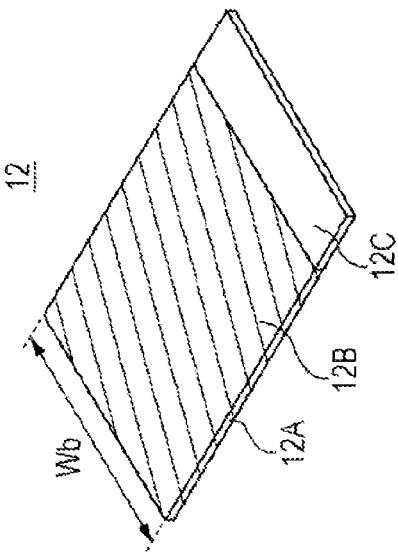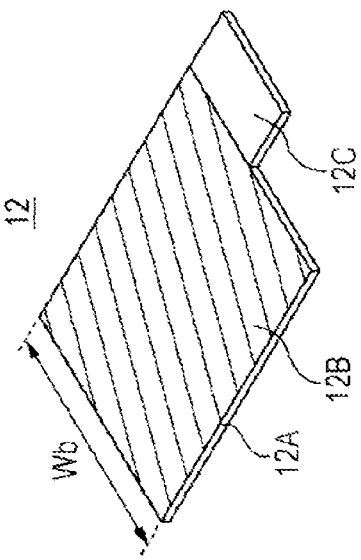

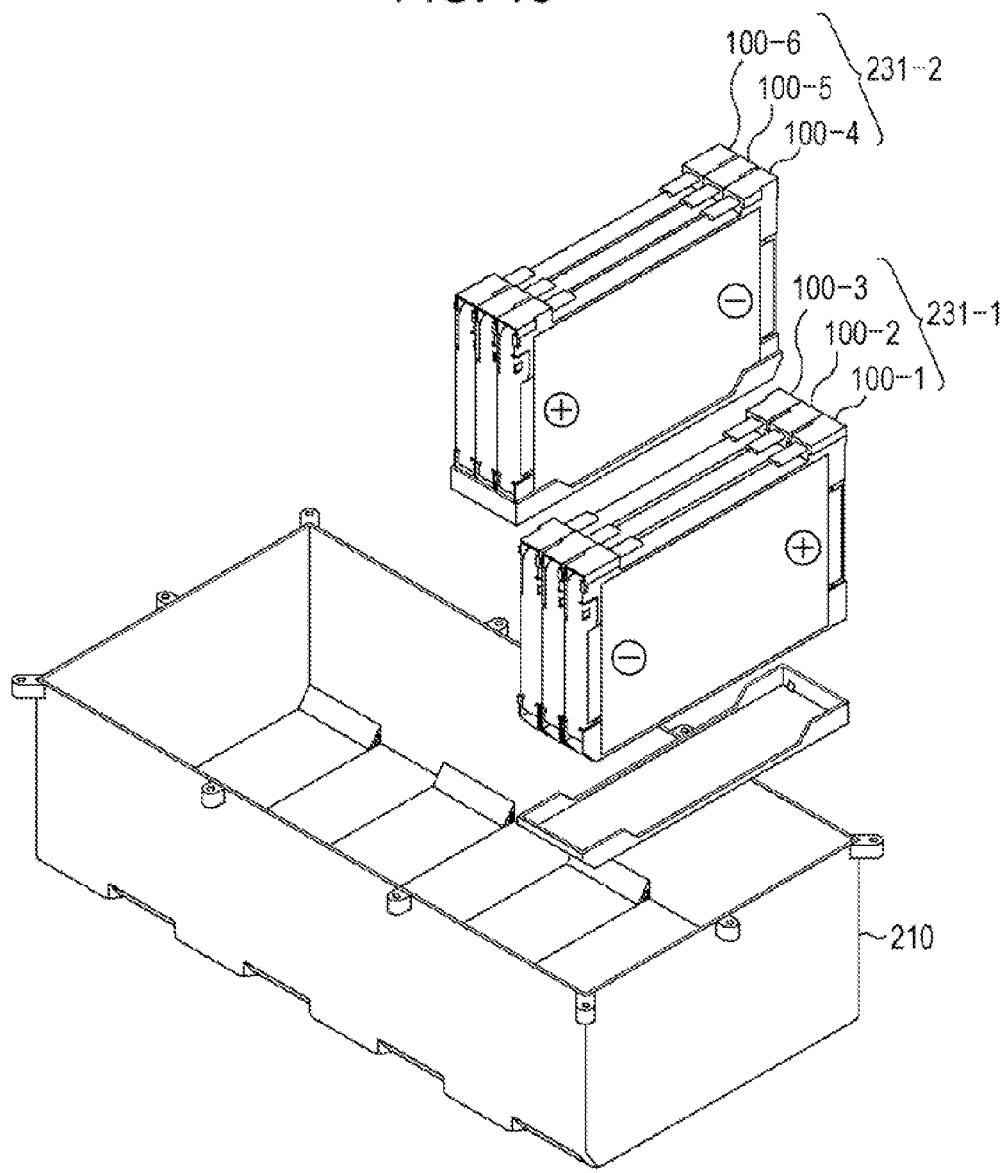

NON-AQUEOUS ELECTROLYTE BATTERY HAVING POROUS POLYMER LAYER BETWEEN LAMINATE FILM AND BATTERY DEVICE

CROSS REFERENCES TO RELATED APPLICATIONS

The present application claims priority to Japanese Patent Application No. 2010-257348 filed on Nov. 17, 2010, the disclosure of which is incorporated herein by reference.

BACKGROUND

The present disclosure relates to a non-aqueous electrolyte battery, in particular a large capacity of non-aqueous electrolyte battery which is manufactured by using a laminate film as a packaging material.

In recent years, a number of portable electronic appliances such as a camera-integrated videotape recorder (VTR), a mobile phone, and a portable computer have appeared, and it is contrived to achieve downsizing and weight reduction thereof. According to that, with respect to batteries, in particular, secondary batteries as a portable power source for such an electronic appliance, development has been actively conducted. Above all, lithium ion secondary batteries which can realize a high energy density have attracted attention.

In recent years, smaller and lighter, and thinner batteries have been developed by using a laminate film or the like, instead of a battery case made of a metal such as aluminum or iron which is a battery packaging material.

However, in a case where materials of low rigidity such as laminate film are used as a packaging material, when forces holding down a battery are weak, a battery device readily moves, such as during application of a shock or falling. Therefore, there is a problem where there is breakage between a connection portion of the battery device and a lead connected to the outer portion of the battery, and thus internal resistance is increased. In particular, since a large and high power laminate package battery for in-vehicle use or the like has a large weight and size, this causes serious problems.

Japanese Unexamined Patent Application Publication No. 2007-87652 discloses an effect where a separator is pulled from an electrode group and welded and fixed to an inner face of a package material, and thereby a voltage reduction and internal resistance increase after a vibration shock is applied can be suppressed.

Japanese Unexamined Patent Application Publication No. 2003-109667 discloses an effect where a resin is added between electrical generation elements and a package vessel, in which the electrical generation elements are fixed to the package vessel, and thereby damage can be suppressed when vibration and deformation pressure are applied.

SUMMARY

However, in the method illustrated in Japanese Unexamined Patent Application Publication No. 2007-87652, a separator has a low strength, whereby movement of battery device is not suppressed to a satisfactory level. In the method illustrated in Japanese Unexamined Patent Application Publication No. 2003-109667, it is difficult to control shape and thickness of a resin, and therefore there is a problem where battery size is increased and thus energy density is not improved.

It is desirable to provide a non-aqueous electrolyte battery capable of realizing high battery characteristics by suppressing movement of a battery device of packaging materials, and suppressing break of connection portion of lead and battery device.

According to an embodiment of the present disclosure, there is provided a non-aqueous electrolyte battery, including: a battery device in which a positive electrode is faced to negative electrode through a separator; a non-aqueous electrolyte; a laminate film which is formed by laminating a metal layer, an outside resin layer formed in outer face of the metal layer, and an inside resin layer formed in the metal layer, and in which the battery device and the non-aqueous electrolyte is packaged by heat welding and housed; a positive electrode lead which is electrically connected to the positive electrode, and drawn from portion heat-welded of the laminate film to an exterior thereof; a negative electrode lead which is electrically connected to the negative electrode, and drawn from portion heat-welded of the laminate film to an exterior thereof; and a porous polymer layer containing, as a component, vinylidene fluoride formed between the laminate film and the battery device.

In the non-aqueous electrolyte battery according to the embodiment, the porous polymer layer containing, as a component, vinylidene fluoride contains at last a copolymer containing as a component, polyvinylidene fluoride and vinylidene fluoride, in which a thickness of porous polymer layer is preferably equal to or higher 1.0 μm and equal to or lower than 5.0 μm. It is preferably to further contain Inorganic particles such as alumina.

According to an embodiment of the present disclosure, movement of battery device in a laminate film can be suppressed by a porous polymer layer containing as a component vinylidene fluoride between battery device and laminate film.

According to an embodiment of the present disclosure, reduction of battery characteristics caused by break of connection portion of an electrode lead and a battery device can be suppressed.

Additional features and advantages are described herein, and will be apparent from the following Detailed Description and the figures.

BRIEF DESCRIPTION OF THE FIGURES

FIGS. 2A to 2D are diagrammatic perspective views illustrating one configuration example of a positive electrode and negative electrode used in a battery applying an embodiment of the present disclosure.

FIG. 13 is a diagrammatic perspective view illustrating a configuration of a battery module using a non-aqueous electrolyte battery according to an embodiment of the present disclosure.

DETAILED DESCRIPTION

Embodiments of the present application will be described below in detail with reference to the drawings. Description will be made according to the following procedure.

1. First Embodiment (Example illustrating configuration of non-aqueous electrolyte battery according to an embodiment of the present disclosure)
2. Second Embodiment (Example of battery device having another configuration)
3. Third Embodiment (Example where porous polymer layer is integrated into gel electrolyte)
4. Fourth Embodiment (Example of battery unit and battery module using non-aqueous electrolyte battery according to an embodiment of the present disclosure)
5. Other Embodiment (Modification example)

1. First Embodiment
(1-1) Configuration of Non-Aqueous Electrolyte Battery

Figure 1A:
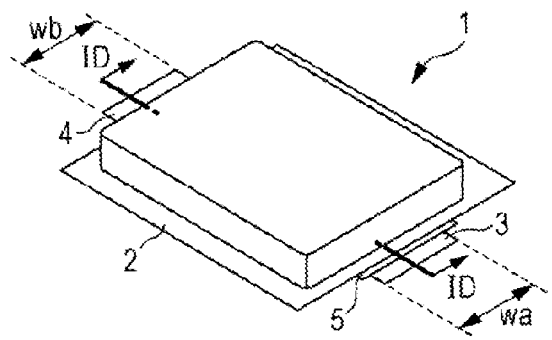
FIGS. 1A to 1D are schematic views illustrating a battery device including a battery applying an embodiment of the present disclosure.
Figure 1B:
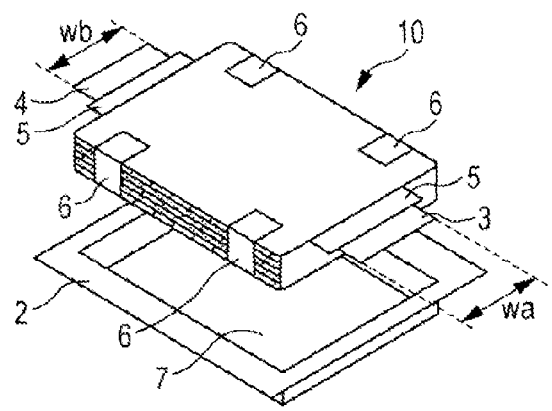
Figure 1C:
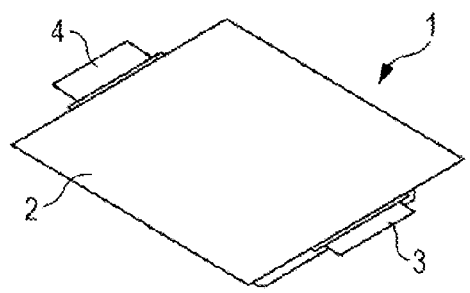
Figure 1D:
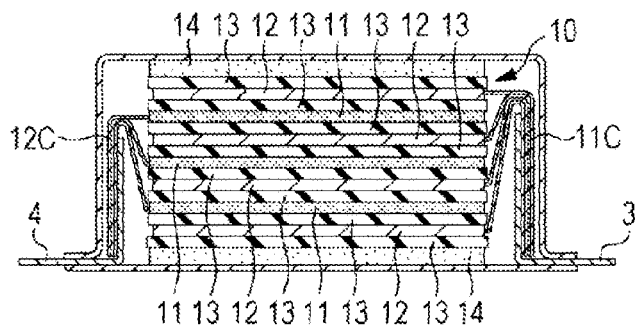

FIG. 1A is a diagrammatic perspective view illustrating an exterior appearance of non-aqueous electrolyte battery 1 according to an embodiment of the present disclosure, and FIG. 1B is a perspective exploded view illustrating a configuration of the non-aqueous electrolyte battery 1. FIG. 1C is a diagrammatic perspective view illustrating a configuration of the bottom of non-aqueous electrolyte battery 1 shown in FIG. 1A. FIG. 1D is a cross-sectional view illustrating cross-section of ID-ID of the non-aqueous electrolyte of the battery 1 in FIG. 1A. In the following description, in non-aqueous electrolyte battery 1, a portion where a positive electrode lead 3 is drawn is referred to as a top portion. A portion where a negative electrode lead 4 is drawn, in which the portion opposes the top portion, is referred to as a bottom portion. Both sides between the top portion and bottom portion are referred to as a side portion. With respect to an electrode or electrode lead, or the like, a side portion-side portion distance is referred to as a width.

The non-aqueous electrolyte battery 1 according to an embodiment of the present disclosure is one where a battery device 10 is packaged with a laminate film 2. From a portion which seals the laminate films 2 each other, a positive electrode lead 3 and negative electrode lead 4 are drawn to the outer portion of the battery, which are connected to the battery device 10. The positive electrode lead 3 and negative electrode lead 4 are drawn from side portions opposing each other.

A thickness of the battery device 10 is preferably equal to or higher than 5 mm and equal to or lower than 20 mm. When the thickness is lower than 5 mm, due to thin battery device, it has little capability for heat storage, and it tends to readily emit heat without uneven surface on a cell. On the other hand, when the thickness is higher than 20 mm, a distance of from the surface of the battery to the central portion thereof is excessively increased, a temperature difference occurs in the battery due to heat being dissipated from only the surface of the battery, and thus it tends to effect a lifespan performance.

The discharge capacity of the battery device 10 is preferably equal to or higher than 3 Ah and equal to or lower than 50 Ah. When the discharge capacity is lower than 3 Ah, since battery capacity is low, there is a tendency that heat generation can be suppressed by other methods such as a method where a thickness of a collector foil is thicker; heat generation can be reduced by lowering resistance. When the discharge capacity is higher than 50 Ah, a battery capacity increases, or dissipation hardly occurs so that temperature variation in a battery tends to increase. A discharge capacity of the aforementioned battery device 10 is a nominal capacity of the non-aqueous electrolyte battery 1. The nominal capacity is calculated from a discharge capacity for a constant current discharge of discharge current of 0.2 C at a maximum voltage of 3.6 V as a charging condition, a final voltage of 2.0 V as constant voltage-constant current charge and discharge conditions of a charge current of 0.2 C.

Figure 3A:
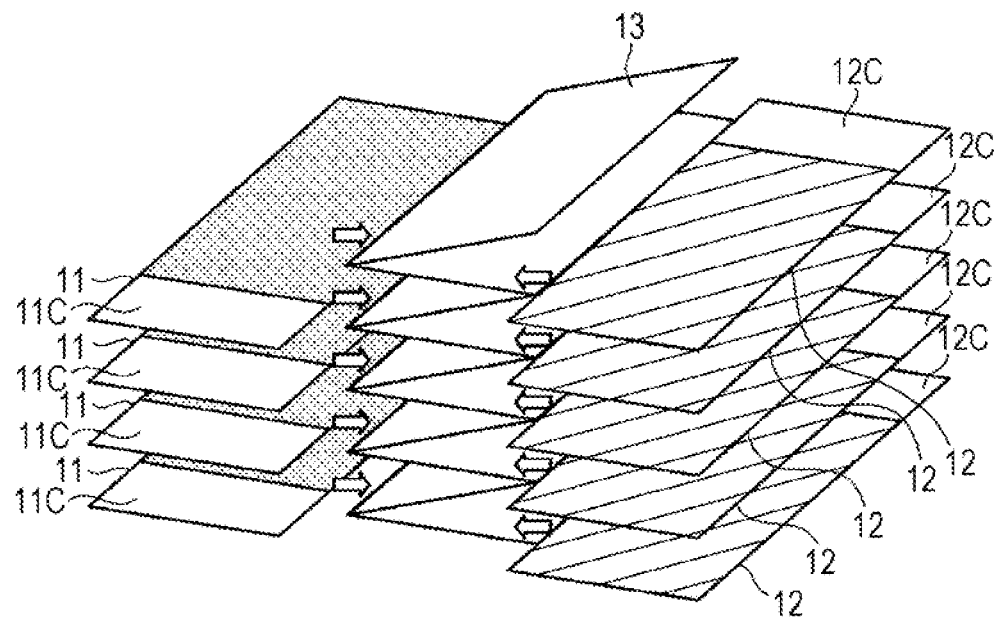
FIGS. 3A and 3B are diagrammatic perspective views illustrating one configuration example of a battery device in a battery applying an embodiment of the present disclosure.
Figure 3B:
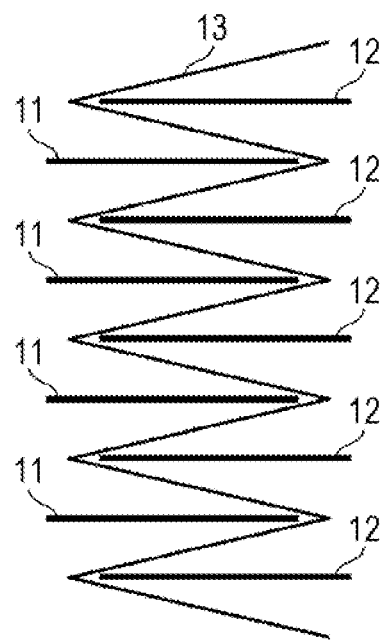
Figure 4:
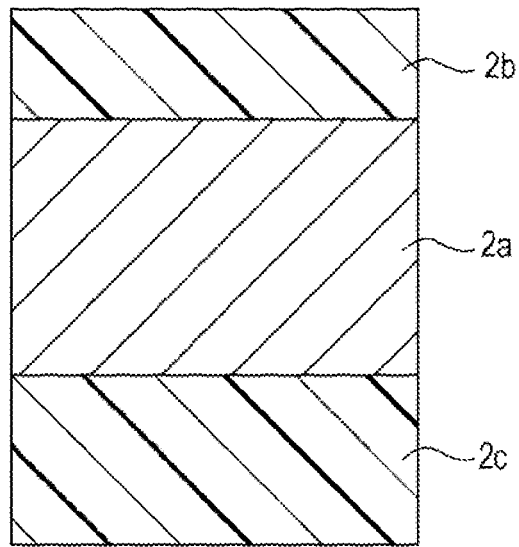
FIG. 4 is a cross-sectional view illustrating a configuration of a packaging material which packages a battery device according to an embodiment of the present disclosure.

The battery device 10 housed in the non-aqueous electrolyte battery 1 has a configuration where rectangular positive electrode 11 shown in FIGS. 2A and 2B, rectangular negative electrode 12 shown in FIG. 2C or 2D are laminated through a separator 13. Specifically, for example, there is a configuration where, as shown in FIGS. 3A and 3B, the positive electrode 11 and negative electrode 12 are alternately laminated through a separator 13 which is bent in a zigzag shape.

Battery Device

The battery device 10 has a laminate type electrode structure where a rectangular positive electrode 11 and rectangular negative electrode 12 are alternately laminated through a separator 13. The first embodiment uses a battery device which is laminated in an order of separator 13, negative electrode 12, separator 13, positive electrode 11, . . . negative electrode 12, and separator 13 such that the outermost part of the battery device is, for example a separator 13. An embodiment of the present disclosure has a porous polymer layer 14 containing, as a component, vinylidene fluoride between the battery device 10 and the laminate film 2. That is to say, on the surface of the separator 13 which is the outermost part of the battery device 10, the aforementioned porous polymer layer 14 is formed.

From the battery device 10, a positive electrode tab 11C which is suspended from plural sheets of positive electrodes 11 respectively and a negative electrodes tab 12C which is suspended from plural sheets of the negative electrodes 12 respectively are drawn. The positive electrode 11c where the plural sheets are laminated is bent such that cross-section has approximately a U-shape in a state of adequate slack in a bending portion. A positive electrode lead 3 is connected to the end of the positive electrode tab 11C where plural sheets are laminated by ultrasonic wave or resistance welding.

The negative electrode tab 12C has a configuration where plural sheets are laminated, and the tab is bent such that a cross-section has approximately a U-shape in a state of adequate slackness in a bending portion, in a similar manner to the positive electrode 11. A negative electrode lead 4 is connected to the end of the negative electrode tab 12C where plural sheets are laminated by ultrasonic wave or resistance welding.

Respective portions including the battery device 10 will be described below.

Positive Electrode Lead

A positive electrode lead 3 which is connected to the positive electrode tab 11C can utilize a metal lead body made of aluminum (Al) or the like. The large capacity non-aqueous electrolyte battery 1 according to an embodiment of the present disclosure is set such that the positive electrode lead 3 has a thicker thickness and wider width in comparison with the related art, in order to obtain a high current.

A width of the positive electrode lead 3 can be arbitrarily determined, but from the viewpoint of obtaining a high current, the width wa of positive electrode lead 3 is equal to or wider than 50% and equal to or narrower than 100% in terms of the width Wa of the positive electrode 11. In a case where the positive electrode lead 3 and negative electrode lead 4 are drawn from the same side, a width wa of the positive electrode lead 3 should be narrower than 50% in terms of the width Wa of the positive electrode 11. The positive electrode lead 3 should be placed without contact with negative electrode lead 4. In this case, in order that the laminate film 2 has a compatibility of a sealing property with high current charge discharge, a width wa of the positive electrode lead 3 is preferably equal to or wider than 15% and equal to or narrower than 40% in term of the width Wa of the positive electrode 11, more preferably equal to or wider than 35% and equal to or narrower than 40%.

A thickness of the positive electrode lead 3 is preferably equal to or thicker than 150 μm and equal to or thinner than 250 μm. When the thickness of the positive electrode lead 3 is thinner than 150 μm, the resultant current is lowered. When the thickness of the positive electrode lead 3 is thicker than 250 μm, the positive electrode lead 3 is excessively thickened, and therefore, adhesiveness of the laminate film 2 is reduced in a drawing side of a lead, and thus moisture impregnation readily occurs.

A sealant 5 as an adhesion film is provided in a portion of the positive electrode lead 3, in order to improve adhesiveness of the laminate film 2 and positive electrode lead 3. The sealant 5 is formed of metal materials with high adhesiveness to resin materials. For example, in a case where the positive electrode lead 3 is formed of the aforementioned metal materials, it is preferably formed of polyolefin resins such as polyethylene, polypropylene, modified polyethylene or modified polypropylene.

A thickness of the sealant 5 is preferably equal to or thicker than 70 μm and equal to or thinner than 130 μm. When the thickness is thinner than 70 μm, adhesiveness of the positive electrode lead 3 to the laminate film 2 is deteriorated. When the thickness is thicker than 130 μm, during heat welding, the welded resin may move significantly, which is not preferable in a production process.

Negative Electrode Lead

A negative electrode lead 4 which is connected to the negative electrode tab 12C can utilize a metal lead body made of nickel (Ni) or the like. The large capacity non-aqueous electrolyte battery 1 according to an embodiment of the present disclosure is set such that the negative electrode lead 4 has a thicker thickness and wider width in comparison with the related art, in order to obtain high current. The thickness of the negative lead 4 is substantially equal to the thickness of the negative electrode tab 12C which will be described below, which is preferable.

A width of the negative electrode lead 4 can be arbitrarily determined, but from the viewpoint of obtaining a high current, the width wb of the negative electrode lead 4 is equal to or wider than 50% and equal to or narrower than 100% in terms of the width Wb of the negative electrode 12. In a case where the positive electrode lead 3 and negative electrode lead 4 are drawn from the same side, a width wb of the negative electrode lead 4 should be narrower than 50% in terms of a width Wb of the negative electrode 12. The negative electrode lead 4 should be placed without contact with positive electrode lead 3. In this case, in order that the laminate film 2 has a compatibility of a sealing property with high current charge discharge, a width wb of the negative electrode lead 4 is preferably equal to or wider than 15% and equal to or narrower than 40% in terms of the width Wb of the negative electrode 12, more preferably equal to or wider than 35% and equal to or narrower than 40%.

A thickness of the negative electrode lead 4 is preferably equal to or thicker than 150 μm and equal to or thinner than 250 μm, similarly to the positive electrode lead 3. When the thickness of the positive electrode lead 3 is thinner than 150 μm, the resultant current is lowered. When the thickness of the positive electrode lead 3 is thicker than 250 μm, the positive electrode lead 3 is excessively thickened, and therefore, adhesiveness of the laminate film 2 is reduced in a drawing side of a lead, and thus moisture impregnation readily occurs.

A sealant 5 as an adhesion film is provided in a similar manner to the positive electrode lead 3 in a portion of the negative electrode lead 4 in order to improve adhesiveness of the laminate film 2 and negative electrode lead 4. The sealant 5 is formed of metal materials with high adhesiveness to metal materials.

A width wa of the positive electrode lead 3 and a width wb of the negative electrode lead 4 are generally the same as width w (in a case where a width wa of the positive electrode lead 3 is the same as a width wb of the negative electrode lead 4, they are referred to as electrode lead width w without distinguishing a width wa of the positive electrode lead 3 from a width wb of the negative electrode lead 4). Electrode lead width w, in a case where a width Wa of the positive electrode 11 is different form a width Wb of the negative electrode 12, is preferably equal to or wider than 50% and equal to or narrower than 100% in terms of the wider width W of a width Wa of the positive electrode 11 and a width Wb of the negative electrode 12. In a case where the positive electrode lead 3 and negative electrode lead 4 are drawn from the same side, electrode lead width w is preferably equal to or wider than 15% and equal to or narrower than 40% in terms of electrode width W, more preferably equal to or wider than 35% and equal to or narrower than 40%.

Positive Electrode

As shown in FIG. 2A, the positive electrode 11 is one in which a positive electrode active material layer 11B containing a positive electrode active material is formed on both surfaces of a positive electrode collector 11A. For the positive electrode collector 11A, for example, a metal foil such as an aluminum (Al) foil, a nickel (Ni) foil and a stainless steel (SUS) foil can be used.

A positive electrode tab 11C which is integrated into a positive electrode collector 11A is suspended. Plural sheets of laminated positive electrode tab 11C are bent so as to have cross-section of approximately a U-shape, and an end portion is connected to a positive electrode lead 3 by ultrasonic wave or resistance welding.

A positive electrode active material layer 11B is formed on the rectangular main surface portion of positive electrode collector 11A. A suspended portion which is exposed in the positive electrode collector 11A has a function as a positive electrode tab 11C which is a connection tab for connecting a positive electrode lead 3. A width of the positive electrode tab 11C may be arbitrarily determined. In particular, in a case where positive electrode lead 3 and negative electrode lead 4 are drawn from the same side thereof, a width of a positive electrode tab 11C is lower than 50% in terms of a width of the positive electrode 11. The positive electrode 11 is obtained by forming an electrode active material layer 11B so as to provide a positive electrode collector with an exposed portion on one side of rectangular positive electrode collector 11A, and cutting off undesired portion.

The positive active material layer 11B includes, for example, a positive electrode active material, a conductor, and a binder. The positive electrode active material include one kind or two or more kinds of positive electrode materials which allow to intercalation and de-intercalation of lithium ions as positive electrode active materials, and may include any other materials such as a binder or a conductor, if necessary.

For example, the positive electrode material capable of intercalation and de-intercalation of lithium ions preferably includes a lithium-containing compound. This is because high energy density is obtained. Examples of the lithium-containing compound include a complex oxide including lithium and a transition metal element or a phosphate compound including lithium and a transition metal element. Of these, it is preferable to contain at least one selected from a group consisting of cobalt, nickel, manganese and iron, as a transition metal element because higher voltage is obtained.

Examples of the complex oxide including lithium and a transition metal element include lithium-cobalt complex oxide ($Li_xCoO_2$), lithium-nickel complex oxide ($Li_xNiO_2$), lithium-nickel-cobalt complex oxide ($Li_xNi_{1-z}CO_zO_2(z<1)$), lithium-nickel-cobalt-manganese complex oxide ($Li_xNi_{(1-v-w)}Co_vMn_wO_2(v+w<1)$), or lithium-manganese complex oxide having a spinel structure ($LiMn_2O_4$) or lithium-manganese-nickel complex oxide ($LiMn_{2-t}Ni_tO_4(t<2)$). Of these, cobalt-containing complex oxide is preferable. This is because high battery capacity and good cycle characteristics are obtained. Moreover, examples of the phosphate compound including lithium and a transition metal element include a lithium-iron phosphate compound ($LiFePO_4$), or a lithium-iron-manganese phosphate compound ($LiFe_{(1-u)}Mn_uPO_4(u<1)$), and the like.

Specific examples of the lithium complex oxide include lithium cobaltate ($LiCoO_2$), lithium nickelate ($LiNiO_2$), lithium manganate ($LiMn_2O_4$), and the like. Moreover, it can utilize a solid solution where a portion of transition metal elements is replaced with other elements. Examples of the complex oxide include nickel-cobalt complex lithium oxide ($LiNi_{0.5}CO_{0.5}O_2$, $LiNi_{0.8}Co_{0.2}O_2$, or the like) as an example. These lithium complex oxides can cause high voltage and have excellent energy density.

From the viewpoint that an improved cycling characteristics and higher electrode filling properties are obtained, it is used as a composite particle where the surface of core particle formed of any of the lithium-containing compounds is covered with fine particles formed of any of the other lithium-containing compounds.

Examples of the positive electrode materials capable of intercalating and de-intercalating lithium ions include the oxide such as vanadium oxide ($V_2O_5$), titanium dioxide ($TiO_2$), and manganese dioxide ($MnO_2$); bisulfide such as iron bisulfide ($FeS_2$), titanium bisulfide ($TiS_2$), and molybdenum bisulfide ($MoS_2$), chalcogenide having no lithium (particularly, layered compound or spinel-type compound) such as niobium biselenide ($NbSe_2$) and the like, lithium-containing compound containing lithium, conductive polymer such as sulfur, polyaniline, polythiophene, polyacetylene or polypyrrole. Of course, positive electrode materials capable of intercalating and de-intercalating lithium ions may be used, in addition to the aforementioned materials. Moreover, a series of positive electrode materials may be mixed in combination of two or more kinds.

Examples of the conductor which is used include carbon materials such as carbon black or graphite. Examples of the binder which is used include polyvinylidene fluoride (PVdF), polytetrafluoroethylene (PTFE) and a copolymer mainly containing these binders.

Negative Electrode

The negative electrode 12 is one in which a negative electrode active material layer containing a negative electrode active material is formed on both surfaces of a negative electrode collector. For the negative electrode collector, for example, a metal foil such as a copper (Cu) foil, a nickel (Ni) foil and a stainless steel (SUS) foil, can be used.

A negative electrode tab 12C integrated into negative electrode collector 12A is suspended. Plural sheets of overlapped negative electrode tab 12C are bent so as to have cross-section of almost U-shape, and an edge portion is connected to a negative electrode lead 4 by ultrasonic wave or resistance welding.

A negative electrode active material layer 12B is formed on the rectangular main portion of the negative electrode collector 12A. A suspended portion which is exposed in the negative electrode collector 12A has a function as a negative electrode tab 12C which is a connection tab for connecting a negative electrode lead 4. A width of the negative electrode tab 12C may be arbitrarily determined. In particular, in a case where positive electrode lead 3 and negative electrode lead 4 are drawn from the same side thereof, a width of a negative electrode tab 12C should be lower than 50% in terms of a width of the negative electrode 12. The negative electrode 12 is obtained forming a negative electrode active material layer 12B so as to have a provided positive electrode collector exposition portion on the side of rectangular negative electrode collector 12A, and cutting undesired portion.

The negative electrode active material layer 12B contains any one or two or more kinds of the negative electrode materials capable of intercalating and de-intercalating lithium ions as the negative electrode active material, if necessary, may contain other materials such as optionally a conductive agent and a binder. In this time, a chargeable capacity of the negative electrode materials capable of intercalating and de-intercalating lithium ions is larger than discharge capacity of positive electrode. Detail on a binder and conductive agent is the same as positive electrode.

Examples of the negative electrode materials capable of intercalating and de-intercalating lithium ions include carbon materials. Specific examples of the carbon material include easily graphitized carbon, hardly graphitized carbon with a (002) plane interval of 0.37 nm or more and graphite with a (002) plane interval of not more than 0.34 nm. More specifically, there are exemplified pyrolytic carbons, cokes, vitreous carbon fibers, organic polymer compound baked materials, active carbon and carbon blacks. Of these, examples of the cokes include pitch coke, needle coke and petroleum coke. The organic polymer compound baked material as referred to herein is a material obtained through carbonization by baking a phenol resin, a furan resin or the like at an appropriate temperature. The carbon material is preferable because a change in a crystal structure following the intercalation and de-intercalation of lithium ions is very small, and therefore, a high energy density is obtainable, excellent cycle characteristics are obtainable, and furthermore, the carbon material also functions as a conductive agent. The shape of the carbon material may be any of a fibrous shape, a spherical shape, a granular shape or a flaky shape.

In addition to the foregoing carbon materials, examples of the negative electrode material capable of intercalating and de-intercalating lithium ions include a material capable of intercalating and de-intercalating lithium ions and containing, as a constituent element, at least one member selected from metal elements and semi-metal elements. This is because a high energy density is obtainable. Such a negative electrode material may be an elemental substances, alloy or compound of a metal element or a semi-metal element. Also, a material having one or two or more kinds of a phase in at least a part thereof may be used.

The "alloy" as referred to herein includes, in addition to those composed of two or more kinds of a metal element, those containing one or more kinds of a metal element and one or more kinds of a semi-metal element. Also, the "alloy" may contain a non-metal element. Examples of its texture include a solid solution, a eutectic (eutectic mixture), an inter-metallic compound and one in which two or more kinds thereof coexist.

Examples of the metal element or semi-metal element include a lithium metal. Examples of a metal element or a semi-metal element capable of forming an alloy together with lithium specifically include magnesium (Mg), boron (B), aluminum (Al), gallium (Ga), indium (In), silicon (Si), germanium (Ge), tin (Sn), lead (Pb), bismuth (Bi), cadmium (Cd), silver (Ag), zinc (Zn), hafnium (Hf), zirconium (Zr), yttrium (Y), palladium (Pd) and platinum (Pt). Of these, one of silicon and tin is preferable, and silicon is more preferable, because it has high ability to intercalate and de-intercalate lithium ions, and therefore high energy density is obtained.

Examples of the negative electrode material having at least one of silicon and tin include elemental substances, alloys or compounds of silicon, elemental substances, alloys or compounds of tin, or materials having at least portion of one or two or more phases.

Examples of the silicon alloys include, as second configuration element other the silicon, at least one of a group consisting of, tin (Sn), nickel (Ni), copper(Cu), iron (Fe), cobalt (Co), manganese (Mn), zinc(Zn), indium (In), silver (Ag), titanium (Ti), germanium (Ge), bismuth (Bi), antimony (Sb) and chromium (Cr). Examples of the tin alloys include, as second configuration element other than tin (Sn), at least one of a group consisting silicon (Si), nickel (Ni), copper(Cu), iron (Fe), cobalt (Co), manganese (Mn), zinc (Zn), indium (In), silver (Ag), titanium (Ti), germanium (Ge), bismuth (Bi), antimony (Sb) and chromium (Cr).

The tin or silicon compounds include, for example, one containing oxygen (O) or carbon (c), and may contain second configuration elements in addition to tin (Sn) or silicon (Si).

In particular, negative electrode materials containing at least one of silicon (Si) and tin (Sn) include, for examples, tin (Sn) as first configuration element, and preferably include second and third configuration elements in addition to tin (Sn). The negative electrode materials may be used together with the aforementioned negative electrode materials. Examples of the second configuration element include at least one of a group consisting of cobalt (Co), iron (Fe), magnesium (Mg), titanium (Ti), vanadium (V), chromium (Cr), manganese (Mn), nickel (Ni), copper(Cu), zinc (Zn), gallium (Ga), zirconium (Zr), niobe (Nb), molybdenum (Mo), silver (Ag), indium (In), cerium (Ce), hafnium (Hf), tantalum (Ta), tungsten (W), bismuth (Bi) and silicon (Si). Examples of the third configuration element include at least one of a group consisting of boron (B), carbon (C), aluminum (Al) and phosphorus (P). This is because cycle characteristics are improved by the second and third configuration elements.

Above all, there is preferable CoSnC-containing materials containing tin (Sn), cobalt (Co) and carbon (C) as configuration elements, in which the content of carbon (C) is in the range of equal to or more than 9.9% by mass and equal to or less than 29.7% by mass, a ratio (Co/(Sn+Co)) of cobalt (Co) to the sum of tin (Sn) and cobalt (Co) is in the range of equal to or more than 30% by mass and equal to or less than 70% by mass. This is because high energy density and excellent cycle characteristics are obtained in a configuration range.

The SnCoC-containing materials may contain other configuration elements if necessary. For example, the other configuration elements preferably include silicon (Si), iron (Fe), nickel (Ni), chromium (Cr), indium (In), niobe (Nb), germanium (Ge), titanium (Ti), molybdenum (Mo), aluminum (Al), phosphorus (P), gallium (Ga) or bismuth (Bi), and may contain two or more kinds of these elements. This is because capacity and cycle characteristics are improved.

The SnCoC-containing materials contain tin (Sn), cobalt (Co) and carbon (C), the phases preferably have low crystalline or amorphous structure. The SnCoC-containing materials are preferably one where at least a portion of carbon as a configuration element is bonded to metal element or semi-metal elements as other configuration elements. This is because reduction of cyclic characteristic is caused by aggregation or crystallization of tin (Sn), or the like, but carbon is bonded to other elements, and thus such aggregation or crystallization is suppressed.

Examples of the negative electrode materials capable of intercalation and de-intercalation of lithium ions include metal oxides or polymer compounds which are capable of intercalation and de-intercalation of lithium ions. Examples of the metal oxides include iron oxide, ruthenium oxide, or molybdenum oxide. Examples of the polymer compounds include polyacetylene, polyaniline or polypyrrole.

The negative electrode materials capable of intercalation and de-intercalation of lithium ions may be materials other than materials described above. The negative electrode materials may be mixed in combination of two or more kinds.

The negative electrode active material layer 12B is formed by, for example, vapor-phase deposition method, liquid-phase deposition method, spraying method, firing method, coating method, or a combination of two or more of these methods. In a case where the negative electrode active material layer 12B vapor-phase deposition method, liquid-phase deposition method, spraying method, or firing method, or two or more kinds of these methods are used, at least one portion of interface between negative electrode active material layer 12B and negative electrode collector 12A is subjected to alloying, which is preferable. Specifically, in the interface, configuration elements of the negative electrode collector 12A are diffused into the negative electrode active material layer 12B, or the configuration elements of the negative electrode active material layer 12B are diffused into the negative electrode collector 12A, or these elements are diffused each other, which is preferable. Destruction of the negative electrode active material layer 12B due swelling and contraction according to charge and discharge can be suppressed, and electron conductivity between negative electrode active material layer 12B and negative electrode collector 12A can be increased.

Examples of vapor-phase deposition methods include physical deposition method and chemical deposition method. Specifically, examples thereof include vacuum evaporation method, sputtering method, ion plating method, laser ablation method, thermal Chemical Vapor Deposition (CVD) method, and plasma CVD method. Examples of liquid-phase deposition methods include common methods such as electrolytic plating method and electroless plating method. Firing method is, for example, a method in which particle shape of the negative electrode active materials are mixed with a binder and dispersed into a solvent, followed by being coated, and then heat treatment is provided at a temperature higher than the melting point of the binder or the like. Examples of firing methods include a common technique such as atmosphere firing method, reactive firing method, and hot press firing method.

Examples of the binder which is used include polyvinylidene fluoride (PVdF), styrenebutadiene-rubber (SBR), and the like.

Separator

A separator is formed of an insulating thin film having high ionic permeability and a predetermined mechanical strength. Specifically, for example include a porous film formed of polyolefine-based materials such as polypropylene (PP) or polyethylene (PE); and a porous film formed of inorganic materials such as a nonwoven fabric made of ceramic, a structure where two or more kinds of these porous films are laminated may be used. Of these, a separator which contains a porous film formed of polyolefine-based materials such as polypropylene or polyethylene has excellent separation property between a positive electrode 11 and a negative electrode 12, can prevent voltage reduction of internal short-circuit or open circuit.

According to the first embodiment, a polymer material containing vinylidene fluoride is previously adhered on both faces of the separator 13. Thereby, a polymer material containing vinylidene fluoride are reacted with a non-aqueous electrolyte to form a porous polymer layer 14 which maintains the non-aqueous electrolyte and forms a gel form. The polymer material containing vinylidene fluoride is adhered so as to have slightly wider width than that of positive electrode 11 and negative electrode 12 on both end portions of the separator 13 which is the outmost layer of the battery device 10. Moreover, both end portions of the separator 13 adheres the polymer material containing vinylidene fluoride, and other portions of the separator 13 may adhere a matrix polymer as other polymer materials for gelation of non-aqueous electrolyte. Moreover, a polymer material is not adhered other than both ends of the separator 13, and a separator 13 disposed between positive electrode 11 and negative electrode 12 may impregnate a non-aqueous electrolyte. Thereby, afterward, when a battery device 10 is manufactured, a porous polymer layer 14 containing vinylidene fluoride is formed on the separator 13 which is disposed on the outermost layer of the battery device 10.

In a large capacity of non-aqueous electrolyte battery according to an embodiment of the present disclosure, a thickness of a separator is preferably equal to or higher than 5 µm and equal to or lower than 25 µm, more preferably equal to or higher than 7 µm and equal to or lower than 20 µm When the separator is excessively thicker, a filling amount of active material is deteriorated so that battery capacity is reduced, and ion conductivity is reduced so that current properties are reduced. When the separator is excessively thinner, mechanical strength of film is reduced.

Configuration of Non-Aqueous Electrolyte Battery

The non-aqueous electrolyte battery 1 includes a battery device 10 sealed in a laminate film 2 together with a non-aqueous electrolyte, in which a porous polymer layer 14 containing vinylidene fluoride is formed between the battery device 10 and the laminate film 2. A thickness of the porous polymer layer 14 containing vinylidene fluoride is preferably equal to or higher than 1.0 µm and equal to or lower than 5.0 µm. In a case where a thickness of the porous polymer layer 14 is 1.0 µm or lower, break of a junction portion between the battery device 10 and electrode lead due to vibration may not be suppressed and, increase in internal resistance of the battery occurs. In a case where a thickness of the porous polymer layer 14 is higher than 5.0 µm, a volume of the porous polymer layer 14 other than a power generation element is increased, and a volumetric efficiency of the battery is decreased.

Non-Aqueous Electrolyte

Non-aqueous electrolyte is one where electrolyte salt is dissolved in a non-aqueous solvent, and is impregnated in a laminate film 2 together with a battery device 10. Examples of the non-aqueous electrolyte which is used include a non-aqueous electrolyte where electrolyte salt is dissolved into a non-aqueous solvent, or a gel electrolyte formed by incorporating a non-aqueous electrolyte in a matrix polymer. A porous polymer layer 14 containing vinylidene fluoride of the first embodiment is a portion of a gel non-aqueous electrolyte formed across both faces of a separator 13 by adhering a polymer containing vinylidene fluoride thereon.

For example, electrolyte salts contain one or two or more kinds of light metal salts such as lithium salt Examples of the lithium salts include lithium hexafluorophosphate ($LiPF_6$), tetrafluoroboric lithium ($LiBF_4$), Lithium perchlorate ($LiClO_4$), hexafluoro arsenic lithium ($LiAsF_6$), tetraphenylboric lithium ($LiB(C_6H_5)_4$), lithium methansulfonate ($LiCH_3SO_3$), trifluoromethane sulfonic lithium ($LiCF_3SO_3$), tetrachloro aluminic lithium ($LiAlCl_4$), dilithium hexafluorosilicate ($Li_2SiF_6$), lithium chloride (LiCl) or lithium bromide (LiBr), or the like. Of these, at least one selected from a group consisting of lithium hexafluorophosphate ($LiPF_6$), tetrafluoroboric lithium ($LiBF_4$), Lithium perchlorate ($LiClO_4$), hexafluoro arsenic lithium ($LiAsF_6$) is preferable. Lithium hexafluorophosphate ($LiPF_6$) is more preferable. This is because resistance of non-aqueous electrolyte is deteriorated. It is preferable that tetrafluoroboric lithium ($LiBF_4$) together with lithium hexafluorophosphate ($LiPF_6$) are used, because an high effect is obtained.

Examples of non-aqueous solvents include ethylene carbonate (EC), propylene carbonate (PC), butylene carbonate (BC), dimethyl carbonate (DMC), diethyl carbonate (DEC), ethyl methyl carbonate (EMC), methylpropyl carbonate (MPC), γ-butyrolactone, γ-valerolactone, 1,2-dimethoxyethane, and tetrahydrofuran, 2-methyltetrahydrofuran, tetrahydropyran, 1,3-dioxolane, 4-methyl-1,3-dioxolane, 1,3-dioxane, 1,4-dioxane, methyl acetate, ethyl acetate, methyl propionate, ethyl propionate, methyl butyrate, methyl isobutyrate, trimethyl methyl acetate, trimethyl ethyl acetate, acetonitrile, glutaronitrile, aslackonitrile, methoxyacetonitrile, 3-methoxypropionitrile, N,N-dimethylformamide, N-methylpyrrolidinone, N-methyloxazolidinone, N,N'-dimethylimidazolidinone, nitromethane, nitroethane, sulfolane, trimethyl phosphate, and dimethyl sulfoxide. In electrochemical device such as battery having a non-aqueous electrolyte, a superior battery capacity, superior cycle characteristics, superior storage characteristics and the like are obtained. These separators may be used independently or in combination of two or more kinds.

Of these, as solvents, at least one of a group consisting of ethylene carbonate (EC), propylene carbonate (PC), dimethyl carbonate (DMC), diethyl carbonate (DEC), ethyl methyl carbonate (EMC) which is used is preferable, because sufficient effect is obtained. In this case, a combination of a high viscosity (high dielectric constant) solvent (for example, specific inductive capacity $\in \geq 30$) such as ethylene carbonate and propylene carbonate and a low viscosity solvent (for example, viscosity≥1 mPa·s) such as dimethyl carbonate, diethyl carbonate, or ethylmethyl carbonate is more preferable. Thereby, dissociation property of the electrolyte salt and ion mobility are improved, and thus higher effect is obtained.

When gel electrolyte layer is formed, generally polymer materials having acceptable properties to non-aqueous solvent are used as a matrix polymer. Examples of the matrix polymer which is used include silicon gel, acryl gel, acrylonitrile gel, a polyphosphazene-modified polymer, polyethylene oxide, polypropylene oxide, and a composite polymer thereof, a cross-linked polymer thereof, and a modified polymer. Moreover, examples of the fluorine-based polymer include polymers such as copolymers containing, as a repetition unit, at least one of polyvinylidene fluoride (PVdF), vinylidene fluoride (VdF), hexafluoropropylene (HFP), trifluoroethylene (TFE) and chlorotrifluoroethylene (CTFE). These polymers may be used independently or in combination of two or more kinds Porous Polymer Layer Containing Vinylidene Fluoride as Component The porous polymer layer 14 provided in the non-aqueous electrolyte battery 1 of the first embodiment is constructed by adhering a polymer material having a function of a separator 13 as the aforementioned matrix polymer and maintaining a non-aqueous electrolyte. That is to say, a gel electrolyte layer and the porous polymer layer 14 are integrated. A polymer material containing, as a component, vinylidene fluoride as a matrix polymer is used on the surface of the separator 13 of the embodiment. Specifically, a copolymer containing polyvinylidene fluoride (PVdF), vinylidene fluoride (VdF), and hexafluoropropylene (HFP) as a repetition unit; or a copolymer containing, as a repetition unit, vinylidene fluoride (VdF), hexafluoropropylene (HFP), and chlorotrifluoroethylene (CTFE) is preferably used.

In a case where polyvinylidene fluoride (PVdF) is used as polymer materials forming the porous polymer layer 14, polyvinylidene fluoride having a weight-average molecular weight of equal to or more than 500,000 and equal to or less than 1,500,000 is preferably used. This is because a moving inhibition effect of battery device 10 is improved.

Inorganic particles may be mixed with the porous polymer layer 14. Strength of the porous polymer layer 14 is increased, convexity and concavity occur on the porous polymer layer 14, disagreement of battery device 10 and a laminate film 2 can be suppressed. Therefore, increase of internal resistance can be suppressed.

Examples of the inorganic particles include metal oxides, metal nitrides, or metal carbides which have an electric insulation. Examples of the metal oxides which can be used include alumina ($Al_2O_3$), magnesia (MgO), titania ($TiO_2$), zirconia ($ZrO_2$), and silica ($SiO_2$). Examples of the metal nitrides which can be used include silicon nitride ($Si_3N_4$), aluminum nitride (AlN), boron nitride (BN), and titanium nitride (TiN). Examples of the metal carbides which can be used include silicon carbide (SiC), and boron carbide ($B_4C$). These particles with heat resistance may be used independently, and in combination of two or more kinds Since inorganic particles have excellent heat resistance, and oxidation resistance, a moving inhibition effect of battery device 10 is prevented during increase of battery temperature, which is preferable.

For example, a polymer material containing vinylidene fluoride as a component may be adhered to only one side of a separator 13 which is the outermost layer of battery device 10.

Laminate Film

A laminate film 2 as a package material which packages the battery device 10 has a configuration where a resin layer is provided on both face of a metal layer 2a formed of metal foil. Generally a laminate film can be constructed by a laminate structure of outside resin layer 2b/metal layer 2a/inside resin layer 2c. The inside resin layer 2c is formed so as to oppose the battery device 10. An adhesion layer having a thickness of equal to or higher than 2 μm and equal to or lower than 7 μm may be provided between the outside resin layer 2b and inside resin layer 2c and metal layer 2a. Each of the outside resin layer 2b and inside resin layer 2c has a configuration of plural layers, respectively.

Metal materials forming the metal layer 2a may have a function as a barrier film with moisture permeability resistance, and metal materials which can be used include aluminum (Al) foil, stainless still (SUS) foil, nickel (Ni) foil and plating iron (Fe) foil. Of these, the aluminum foil being thin, light and having excellent workability is preferably used. In particular, from the viewpoint of workability, annealed aluminum (JIS A8021P-O), (JIS A80 79P-O) or (JIS AlN30-O) is preferably used.

A thickness of the metal layer 2a is preferably equal to higher than 30 μm and equal to or lower than 150 μm. In a case where a thickness is lower than 30 μm, strength of materials is deteriorated. In a case where a thickness is higher than 150 μm, process is predominantly difficult, a thickness of laminate film 2 is increased, a volumetric efficiency of non-aqueous electrolyte battery is reduced.

The inside resin layer 2c has a portion which is dissolved and welded to each other, and the resin layer which can be used includes polyethylene (PE), flat polypropylene (CPP), polyethylene terephthalate (PET), low density polyethylene (LDPE), high density polyethylene (HDPE), straight chain low density polyethylene (LLDPE), and can be selected and used from plural kinds of these resins.

A thickness of the inside resin layer 2c is preferably equal to or higher than 20 µm and equal to or lower than 50 µm. When the thickness is lower than 20 µm, adhesiveness is deteriorated, pressure buffer effect is insufficient, and thus short circuit easily occurs. When the thickness is higher than 50 µm, moisture is easily infiltrated through the inside resin layer 2c, there are problems where gas occurs in a battery, the battery is swollen according to that, and reduction of battery characteristics occurs. A thickness of inside resin layer 2c is a thickness before package of the battery device 10. A laminate film 2 is packaged with respect to the battery device 10 and sealed, and then two layers of the inside resin layers 2c are welded to each other, and therefore there is a case where a thickness of the inside resin layer 2c is out of the aforementioned range.

For example, in the inside resin layer 2c, concavity and convexity are formed on the surface thereof by embossing. Thereby, sliding is deteriorated between the porous polymer layer 14 and laminate film 2, and a moving inhibition effect of battery device 10 can be increased.

From the viewpoint of beauty of appearance and strength, or flexibility, the outside resin layer 2b which is used include polyolefine-based resin, polyamide-based resin, polyimide-based resin, and polyester. Specifically, the layer which is used includes nylon (Ny), polyethylene terephthalate (PET), polyethylene naphthalate (PEN), polybutylene terephthalate (PBT), and polybutylene naphthalate (PBN). Plural kinds of these resin layers can be selected and used.

Since a laminate film 2 is adhered by dissolving the inside resin layer 2c each other by heat welding, it is preferable that the outside resin layer 2b has higher melting point than the inside resin layer 2c. This is because only an inner resin layer 21c is allowed to be melted during heat welding. Therefore, the outside resin layer 2b can select materials used by the resin materials selected as the inside resin layer 2c.

A thickness of the outside resin layer 2b is preferably equal to or higher than 25 µm and equal to lower than 35 µm. When the thickness is lower than 25 µm, a function as a protective layer is deteriorated, when the thickness is higher than 35 µm, volumetric efficiency of the non-aqueous electrolyte battery is reduced.

The aforementioned battery device 10 is packaged by the aforementioned laminate film 2. In this time, the positive electrode lead 3 connected to the positive electrode tab 11C and the negative electrode lead 4 connected to the negative electrode tab 12C are drawn to outside of battery from a sealing portion of the laminate film 2. As shown in FIG. 1B, a battery device housing 7 previously formed by deep drawability process is provided in the laminate film 2. A battery device 10 is housed in the battery device housing 7.

According to an embodiment of the present disclosure, a peripheral portion of the battery device 10 is heated by a heat head, a laminate film 2 is covered from both faces of the battery device 10, and then sealed by heat welding the laminate films 2 each other. In particular, in a drawn side of the lead, a laminate film 2 is preferably heat welded by a heat head where a cutout is provided away from the positive electrode lead 3 and the negative electrode lead 4. Such load which is applied to the positive electrode lead 3 and negative electrode lead 4 is reduced to manufacture a battery. By this method, short cut can be prevented during manufacture of battery.

The non-aqueous electrolyte battery 1 of an embodiment of the present disclosure controls a thickness of a drawn portion of the lead after sealing a laminate film 2 by heat-welding, and therefore have high safety and battery characteristics.

(1-2) Production Method of Non-Aqueous Electrolyte Battery

The aforementioned non-aqueous electrolyte battery can be produced by the following processes.

Manufacture of Positive Electrode

A positive electrode active material, a conducting agent, and a binder are mixed to prepare a positive electrode mixture, the positive electrode mixture is dispersed into a solvent such as N-methyl-2-pyrrolidone to form positive electrode mixture slurry. Then, the positive electrode mixture slurry is coated on both face of a belt-like positive electrode collector 11A followed by drying the solvent, and then compressed and formed by a roll press machine to form a positive electrode active material layer 11B, and thus used as a positive electrode sheet. The positive electrode sheet is cut to the predetermined dimension, to manufacture a positive electrode 11. In this time, the positive electrode active material layer 11B is formed so as to expose a portion of a positive electrode collector 11A. The exposed portion of the positive electrode collector 11A is used as positive electrode tab 11C. If necessary, undesired exposed portion of the positive electrode collector may be cut to form a positive electrode tab 11C. Thereby, a positive electrode 11 into which a positive electrode tab 11C is integrated is obtained.

Manufacture of the Negative Electrode

A negative electrode active material and a binder are mixed to prepare a negative electrode mixture, which is dispersed into solvent such as N-methyl-2-pyrrolidone to form a negative electrode mixture slurry. Then, a belt-like positive electrode collector 12A is coated with the negative electrode mixture slurry, followed by drying the solvent, and then compressed and formed by a roll press machine to form a negative electrode active material layer 12B, and thus used as a negative electrode sheet. The negative electrode sheet is cut to the predetermined dimension, to manufacture a negative electrode 12. In this time, the negative electrode active material layer 12B is formed such that a portion of a negative electrode collector 12A is exposed. An exposed portion of the negative electrode collector 12A is used as negative e electrode tab 12C. If necessary, undesired exposed portion of the negative electrode collector may be cut to form a negative electrode tab 12C. Thereby, a negative electrode 12 into which a negative electrode tab 12C is integrated is obtained.

Manufacture of Separator

The separator 13 which is used includes a microporous resin film where a polymer material containing vinylidene fluoride is adhered to the surface thereof. These separators are obtained by coating the surface of the microporous resin film with a polymer solution where a polymer material containing vinylidene fluoride is dissolved in solvent such as N-methyl-2-pyrrolidone and being dried to remove a solvent.

Laminate Process

As shown in FIGS. 3A and 3B, the positive electrodes 11 and the negative electrodes 12 are alternately inserted between a separator 13 which is bent in zigzag shape, for example, a predetermined number of positive electrodes 11 and negative electrodes 12 are laminated so as to have separator 13, negative electrode 12, separator 13, positive electrode 11, separator 13, negative electrode 12, . . . separator 13, negative electrode 12, separator 13. Then, they are pressed and fixed so as to closely attach positive electrode 11, negative electrode 12 and separator 13, to manufacture a battery device 10. For solidly fixing the battery device 10, for example, a fixing member 6 such as an adhesive tape can be used. In a case where the battery device is fixed using the fixing member 6, for example, a fixing member 6 is provided on both sides of a battery device 10.

Then, plural sheets of the positive electrode tab 11C and plural sheets of the negative electrode tab 12C are bent so as to have cross-section U-shape. For example, the electrode tab is bent described below.

First Tab U-Shape Bending Process

Plural positive electrode tabs 11C pulled from the laminated positive electrode 11 and plural negative electrode tabs 12C pulled from the laminated negative electrode 12 are bent so as to have cross-section of U-shape. First U-shape bending process allows previously positive electrode tab 11C and negative electrode tab 12C to have optimal U-shape. By bending to have cross-section of U-shape, when the positive electrode tab 11C and negative electrode tab 12C which are connected to the positive electrode lead 3 and the negative electrode lead 4 are bent to form U-shape bending portion, they are allowed not to apply stress such as tension stress to the positive electrode tab 11C and negative electrode tab 12C.

FIGS. 5A to 5E are side views illustrating first U-shape bending process of the negative electrode tab 12C. In FIGS. 5A to 5E, respective processes performed with respect to the negative electrode tab 12C will be described. Moreover, first U-shape bending process will be performed with respect to the positive electrode collector 11A in a similar manner to the process described above.

Figure 5A:
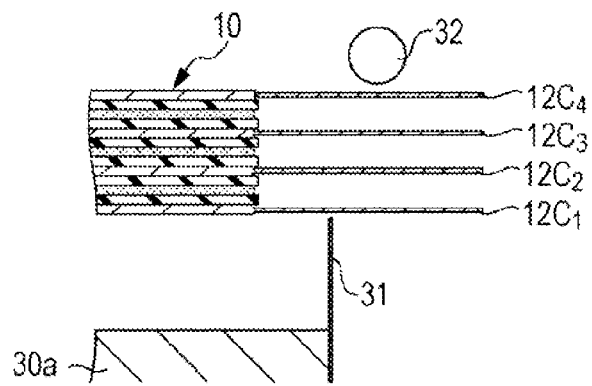
FIGS. 5A to 5E are process diagrams illustrating U-shape bending process of an electrode tab in a battery device according to an embodiment of the present disclosure.

First, as shown in FIG. 5A, a battery device is disposed over a workset die 30a with a U-shape bending thin plate 31. The U-shape bending thin plate 31 is provided so as to protrude from the workset die 30a in which height of the protruding plate is slightly lower than a thickness of battery device 10, specifically at least low as total thickness of plural negative electrode tabs $12C_1$ to $12C_4$. Thereby, a bending peripheral side of the negative electrode tab $12C_4$ is positioned in a range of a thickness of the battery device 10, and therefore, thickness increase or external appearance failure of a non-aqueous electrolyte battery 1 can be prevented.

Figure 5B:
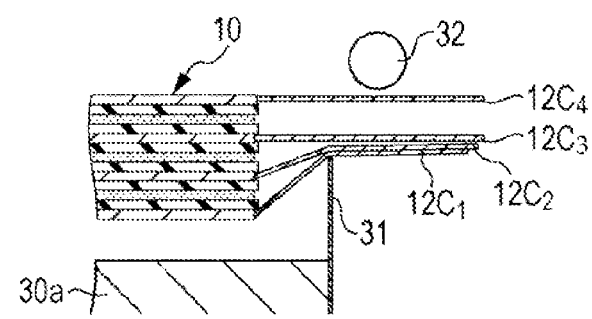

Subsequently, as shown in FIG. 5B, the battery device 10 moves down or the workset die 30a moves up. In this time, the lower a distance between battery device 10 and U-shape bending thin plate 31, a space efficiency of the non-aqueous electrolyte battery 1 is increased, and therefore, for example a distance between the battery device 10 and the U-shape bending thin plate 31 is allowed to be gradually lowered.

Figure 5C:
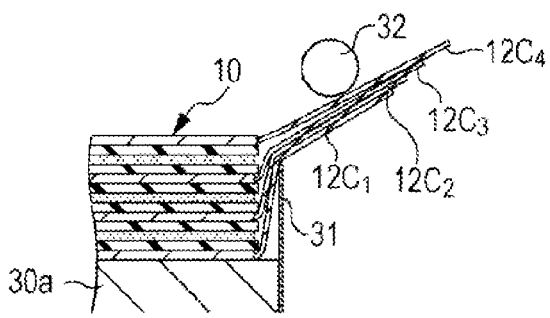
Figure 5D:
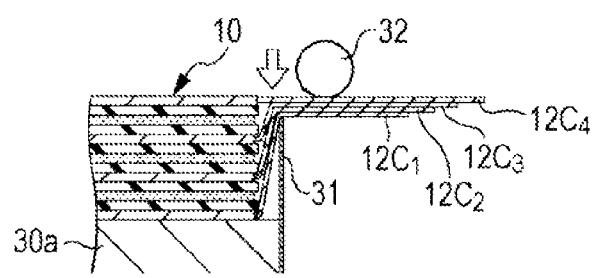
Figure 5E:
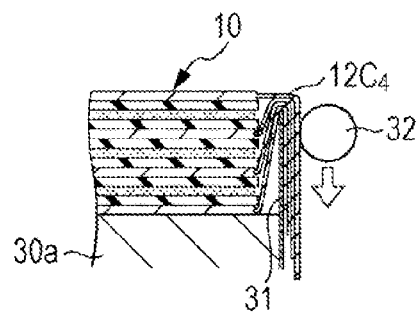

As shown in FIG. 5C, the battery device 10 is loaded on the workset die 30a, a bending portion of the negative electrode tab 12C is formed, and then, as shown in FIGS. 5D and 5E, a roller 32 moves down and negative electrode tab 12C is bent in the form of U-shape.

The U-shape bending thin plate 31 has a thickness of 1 mm or lower, for example preferably about 0.5 mm. When the U-shape bending thin plate 31 is thin, materials which have a strength for forming a bending shape of a plurality of positive electrode tabs 11C or negative electrode tabs 12C can be used. Strength for U-shape bending thin plate 31 varies depending on the number of laminate sheet of the positive electrode 11 and negative electrode 12 or hardness of materials used in the positive electrode tab 11C and negative electrode tab 12C. The thinner a U-shape bending thin plate 31, curvature of the negative electrode tab $12C_1$ of the bending innermost periphery can be lowered, and a distance for bending the negative electrode tab 12C can be lowered, which is preferable. Examples of the U-shape bending thin plate 31 which can be used include stainless steel (SUS), reinforced plastic materials, and plating steel materials, or the like.

Cutting Process of Collector Exposition Portion

Then, the end of a negative electrode tab 12C which forms the U-shape bending portion is cut. A cutting process of collector exposition portion previously forms U-shape bending portion having an optimal form, excess of positive electrode tabs 11C and negative electrode tabs 12C is cut along the U-shape bending form. FIGS. 6A to 6E are side views illustrating a cutting process of the negative electrode tab 12C. Cutting process of Collector exposition portion will be performed with respect to the positive electrode tab 11C in a similar manner to the process described above.

Figure 6A:
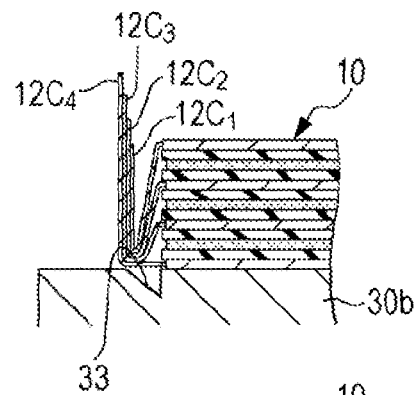
FIGS. 6A to 6E are process diagrams illustrating U-shape bending process of an electrode tab in a battery device according to an embodiment of the present disclosure.

As shown in FIG. 6A, a upper face and a lower face of the battery device 10 is upside down, in which a U-shape bending portion is formed in the first U-shape bending process, a battery device 10 is fixed to a workset die 30b having a portion for avoiding a collector slack 33.

Figure 6B:
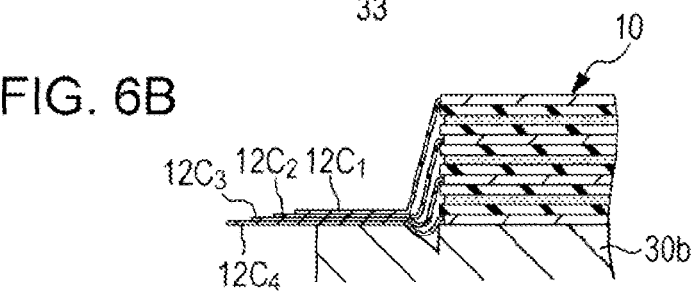

Then, as shown in FIG. 6B, an end portion reaching to the end from U-shape bending portion of the negative electrode tabs $12C_1$ to $12C_4$ where a U-shape bending portion is formed is modified so as to have almost L-shape along a workset die 30b. In this time, by maintaining a shape for forming a U-shape bending portion, a large slack occurs as a negative electrode tab $12C_4$ of a bending periphery. Such slack is gotten into the portion for avoiding a collector slack 33 of workset die 30b, and thereby the negative electrode tabs $12C_1$ to $12C_4$ can be modified without stress. The end portion of the negative electrode tabs $12C_1$ to $12C_4$ is fixed, and the negative electrode tabs $12C_1$ to $12C_4$ may be modified.

Figure 6C:
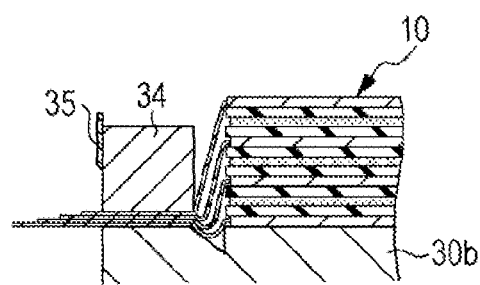
Figure 6D:
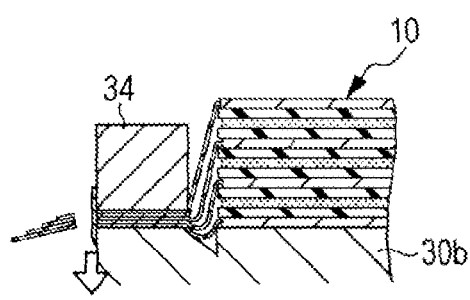
Figure 6E:
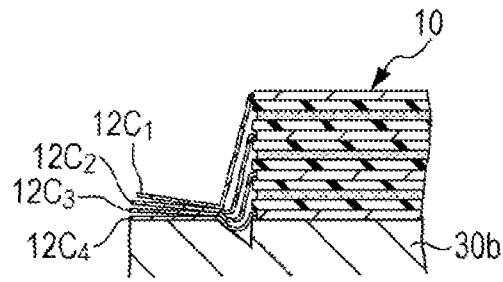

Subsequently, as shown in FIG. 6C, the negative electrode tabs $12C_1$ to $12C_4$ are pressed on the workset die 30b by a collector holding member 34. Then, as shown in FIGS. 6D and 6E, for example, the end of the negative electrode tabs $12C_1$ to $12C_4$ is cut with a cutting cutter 35 provided along a collector holding member 34. As a cutting portion of the negative electrode tabs $12C_1$ to $12C_4$, at least the excess of the negative electrode tabs $12C_1$ to $12C_4$ are cut, when U-shape bending is performed again, such that the end of the negative electrode tabs $12C_1$ to $12C_4$ is positioned in the range of a thickness of the battery device 10.

Electrode Lead Connection Process

Figure 7A:
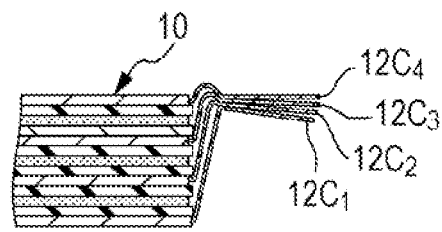
FIGS. 7A to 7C are process diagrams illustrating a connection process of an electrode tab and an electrode lead in a battery device according to an embodiment of the present disclosure.
Figure 7B:
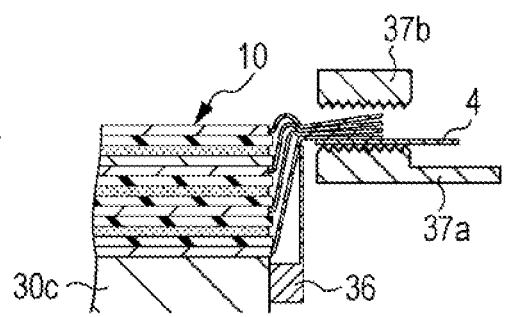
Figure 7C:
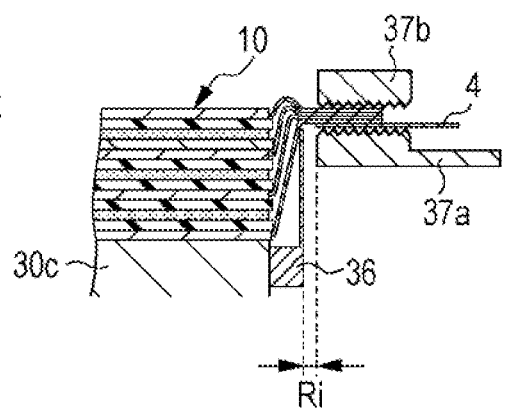

Subsequently, connection of the negative electrode tabs $12C_1$ to $12C_4$ and the negative electrode lead 4 is performed. In a tab connection process, an optimal U-shape bending shape formed in first U-shape bending process is maintained, while positive electrode lead 3 and negative electrode lead 4 are fixed and adhered to positive electrode tab 11C and negative electrode tab 12C. Thereby, positive electrode lead 3 is electrically connected to the positive electrode tab 11C, and negative electrode lead 4 is electrically connected to negative electrode tab 12C. FIGS. 7A to 7C are side views illustrating a connection of the negative electrode tabs $12C_1$ to $12C_4$ and the negative electrode lead 4. As being not shown, sealant 5 is provided in the negative electrode lead 4. Connection process is performed with respect to the positive electrode tab 11C and positive electrode lead 3 in a similar manner to the process described above.

As shown in FIG. 7A, in an electrode terminal cutting process, a upper face and lower face of the battery device 10 which cuts an excess end of the negative electrode tab $12C_1$ to $12C_4$, are upside down again. Then, as shown in FIG. 7B, the battery device 10 is fixed on a workset die 30c with a collector maintaining plate 36. The bending inner periphery side of the negative electrode tab $12C_1$ is positioned in the end of the collector maintaining plate 36, a bending shape of the negative electrode tabs $12C_1$ to $12C_4$ is maintained and, for example an effect of external factors such as ultrasonic wave vibration which occurs from a fixing apparatus is prevented.

As shown in FIG. 7C, for example, negative electrode lead 4 is fixed to negative electrode tabs $12C_1$ to $12C_4$ by ultrasonic waves welding. For the ultrasonic waves welding, an anvil 37a provided in lower portion of the negative electrode tabs $12C_1$ to $12C_4$, and a hone 37b provided in upper portion of the negative electrode tabs $12C_1$ to $12C_4$ are used. Negative electrode tab $12C_1$ to $12C_4$ are set in anvil 37a, followed by moving hone 37b downward, negative electrode tab $12C_1$ to $12C_4$ and negative electrode lead 4 are pinched by anvil 37a and hone 37b. Ultrasonic vibration is provided in negative electrode tabs $12C_1$ to $12C_4$ and negative electrode lead 4 by anvil 37a and hone 37b. Thereby, negative electrode tabs $12C_1$ to $12C_4$ and negative electrode lead 4 are fixed and adhered to each other.

In the tab connection process, the negative electrode lead 4 may be connected to the negative electrode tab 12C such that an inner periphery side bending wrinkle Ri described above is formed with reference to FIG. 7C. The inner periphery side bending wrinkle Ri is set to be equal to or larger than a thickness of the positive electrode lead 3 and negative electrode lead 4.

Figure 8A:
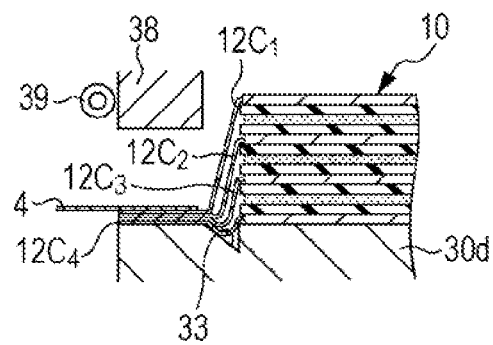
FIGS. 8A to 8E are process diagrams illustrating a bending process of an electrode lead connected to battery device according to an embodiment of the present disclosure.
Figure 8B:
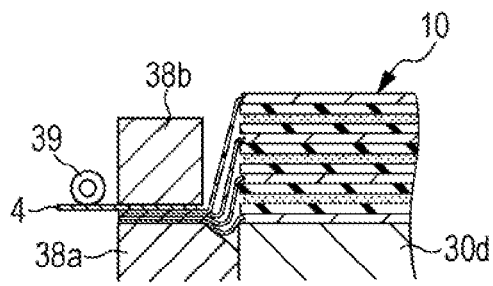
Figure 8C:
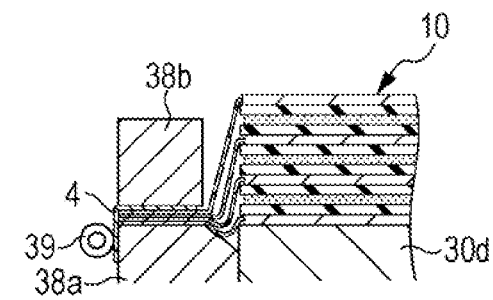

Then, the negative electrode lead 4 which is fixed to the negative electrode tabs $12C_1$ to $12C_4$ is bent in the predetermined shape. FIGS. 8A to 8C is a side view illustrating a tab bending process of the negative electrode lead 4. A tab bending process and electrode lead connection process is performed with respect to the positive electrode tab 11C and positive electrode lead 3 in a similar manner to the process described above.

As shown in FIG. 8A, a upper face and lower face of the battery device 10 is upside down, where in the connection process, negative electrode lead 4 is fixed to the negative electrode tabs $12C_1$ to $12C_4$. The battery device 10 is fixed on a workset die 30d with a portion for avoiding a collector slack 33. A connection portion of the negative electrode tab $12C_1$ to $12C_4$ and negative electrode lead 4 is loaded on a tab bending die 38a.

Subsequently, as shown in FIG. 8B, a connection portion of the negative electrode tab $12C_1$ to $12C_4$ and negative electrode lead 4 are held by a block 38b. As shown in FIG. 8C, a roller 39 moves down and thereby the negative electrode lead 4 which protrudes from the tab bending die 38a and block 38b is bent.

Second Tab U-Shape Bending Process

Figure 8D:
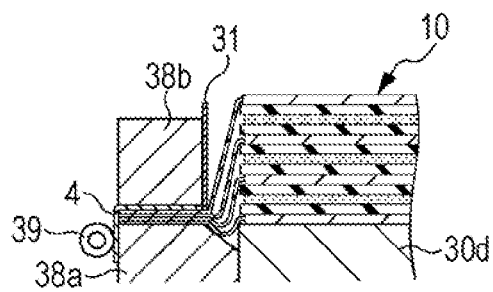
Figure 8E:
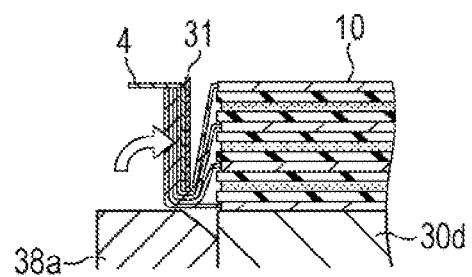

Subsequently, as shown in FIG. 8D, the U-shape bending thin plate 31 is disposed between the battery device 10 and, the block 38b which hold negative electrode tabs $12C_1$ to $12C_4$. Subsequently, as shown in FIG. 8E, the negative electrode tabs $12C_1$ to $12C_4$ are bent in an angle of 90° along U-shape bending form formed in first U-shape bending process as shown in FIGS. 5A to 5E, and thereby forming the battery device 10. In this time, as described above, the negative electrode lead 4 is connected to negative electrode tab 12C so as to form an inner periphery side bending wrinkle Ri of FIG. 7C. Thereby, in second tab U bending process, the negative electrode tab 12C can be bent to almost a direction perpendicular to an electrode face without contact with the negative electrode lead 4 to positive electrode 11 and negative electrode 12 which are laminated.

In this time, the negative electrode lead 4 is preferably bent together with previously heat-welded sealant 5. A bending portion of the negative electrode lead 4 is coated with sealant 5, and thereby can form a configuration without a direct connection of the negative electrode lead 4 and laminate film 2. By this configuration, friction of a resin layer and the negative electrode lead 4 in the laminate film 2 due to long term of vibration and impact, break of laminate film 2, risk of short circuit of a laminate film 2 with a metal layer can be reduced substantially. Thereby, the battery device 10 is manufactured.

Package Process

Then, the manufactured battery device 10 is packaged with a laminate film 2, one of a side portions and a top portion and bottom portion is heated and heat welded by a heater head. For example, the top and bottom portion where the positive electrode lead 3 and negative electrode lead 4 are drawn are heated and heat-welded a heater head with a cutout.

Subsequently, from opening of other side portions without heat welding, non-aqueous electrolyte is infiltrated. Lastly, the laminate film 2 of the infiltrated side portion is heat-welded, and thus the battery device 10 is sealed with the laminate film 2. Then, from the exterior portion of the laminate film 2, the battery device 10 is pressed and heated, non-aqueous electrolyte is maintained by a polymer material containing vinylidene fluoride. Thereby, a gel electrolyte layer between positive electrode 11 and negative electrode 12 is formed. A gel electrolyte layer is formed on the surface of separator 13 which is the outermost face of the battery device 10, and thereby a porous polymer layer 14 containing vinylidene fluoride as a component between the battery device 10 and laminate film 2 is formed together.

2. Second Embodiment

A second embodiment will disclose a case using a method forming the battery device 10 having a configuration which is different from the first embodiment and the porous polymer layer 14 which is different from the first embodiment. Only configuration of the battery device 10 slightly different from first embodiment and formation of the porous polymer layer 14 containing vinylidene fluoride as a component will be described.

(2-1) Configuration of Non-Aqueous Electrolyte Battery Device

Battery Device

Figure 9A:
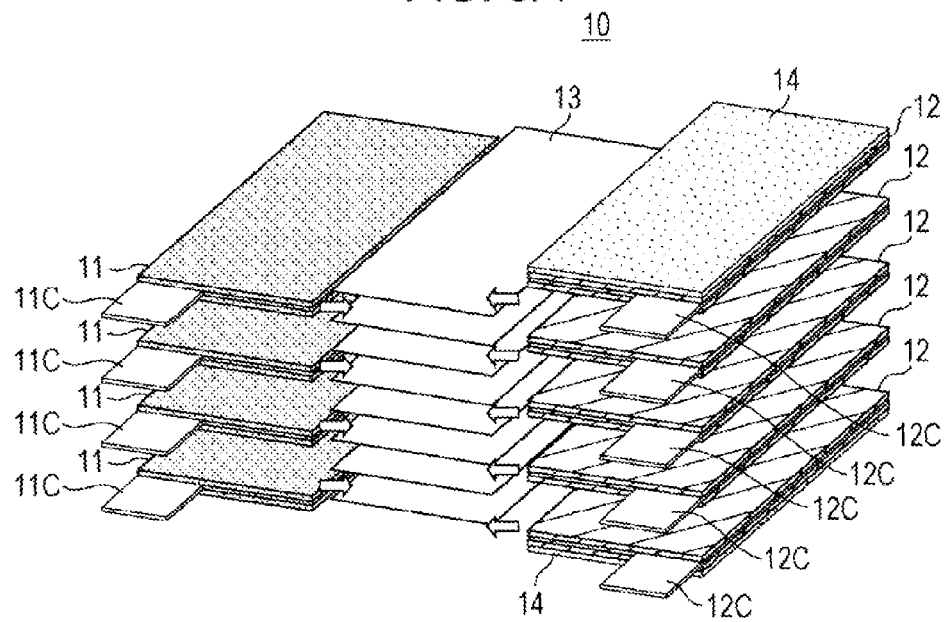
FIGS. 9A and 9B are a diagrammatic perspective view and cross-sectional view illustrating a configuration of a battery device according to a second embodiment of the present disclosure.
Figure 9B:
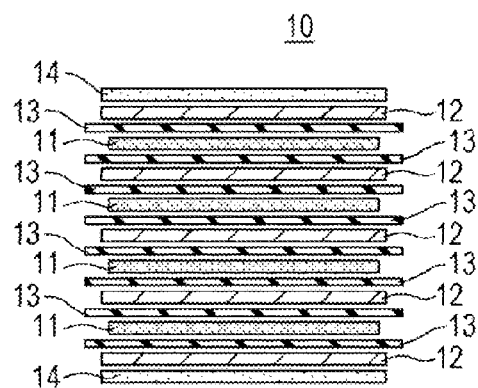

The battery device 10 is housed in the non-aqueous electrolyte battery 1 has a configuration where a rectangular positive electrode 11 shown in FIG. 2A or 2B and a rectangular negative electrode 12 shown in FIG. 2C or 2D are laminated through a separator 13, in a similar manner to the first embodiment. Specifically, for example, as shown in FIGS. 9A and 9B, there has a configuration where the positive electrode 11 and negative electrode 12 are alternately laminated through a rectangular separator 13.

The battery device 10 has a laminate type electrode structure where the positive electrode 11 and negative electrode 12 are alternately laminated through a rectangular separator 13. The second embodiment uses a battery device which is laminated in an order of the negative electrode 12, the separator 13, the positive electrode 11, the separator 13 . . . the separator 13, the negative electrode 12 such that the outermost of the battery device is, for example a negative electrode 12. The non-aqueous electrolyte battery 1 of the second embodiment has a porous polymer layer 14 containing, as a component, vinylidene fluoride between the battery device 10 and laminate film 2. That is to say, on the surface of the negative electrode 12 which is the outermost of the battery device 10, a porous polymer layer 14 containing, as a component, vinylidene fluoride is formed. In the battery device 10 of second embodiment, a gel electrolyte layer which is not shown is previously formed on both faces of the positive electrode 11 and negative electrode 12. The gel electrolyte layer provided on the outermost layer of the battery device 10 has a function of the porous polymer layer 14 according to an embodiment of the present disclosure. Therefore, the gel electrolyte layer has the same component as the porous polymer layer 14.

From the battery device 10, a positive electrode tab 11C which is suspended from plural sheets of positive electrode 11 respectively and a negative electrode tab 12C which is suspended from plural sheets of the negative electrode 12 respectively are drawn. The positive electrode tab 11C has a configuration where the plural sheets are laminated is bent so as to have cross-section of approximately a U-shape in a state of adequate slack in a bending portion. A positive electrode lead 3 is connected to the end of the positive electrode tab 11C where plural sheets are laminated by methods such as ultrasonic wave or resistance welding.

The negative electrode tab 12C has a configuration where plural sheets are laminated, and the plural sheets are laminated is bent so as to have cross-section of approximately a U-shape in a state of adequate slack in a bending portion, in a similar manner to the positive electrode 11. A negative electrode lead 4 is connected to the end of the negative electrode tab 12C where plural sheets are laminated by methods such as ultrasonic wave or resistance welding.

(2-2) Production Method of Non-Aqueous Electrolyte Battery

The aforementioned non-aqueous electrolyte battery can be manufactured by the following process.

Manufacture of Positive Electrode and Negative Electrode

The positive electrode 11 and negative electrode 12 can be manufactured in a similar manner to the first embodiment. The second embodiment previously forms a gel electrolyte layer on both faces of the positive electrode 11 and negative electrode 12. As described above, in a second embodiment, a gel electrolyte layer provided in the outermost layer of the battery device 10 has a function of the porous polymer layer 14 according to an embodiment of the present disclosure. Therefore, the gel electrolyte layer is formed by coating a non-aqueous electrolyte similarly to in the first embodiment and a precursor solution mixed with a polymer material containing vinylidene fluoride which has a function as a matrix polymer on both faces of positive electrode 11 and negative electrode 12, and dissolving an undesired solvent.

Manufacture of Separator

In the separator 13 of a second embodiment, a polymer material containing vinylidene fluoride is not adhered on the surface of a microporous resin film, which is different from the first embodiment. This is because a gel electrolyte layer having a function as a porous polymer layer 14 is previously formed on both faces positive electrode 11 and negative electrode 12.

Laminate Process

As shown in FIGS. 9A and 9B, on both faces, the positive electrode 11 and negative electrode 12 where the gel electrolyte layer is formed, are laminated through a rectangular separator 13. For example, a predetermined number of positive electrode 11 and negative electrode 12 is laminated so as to have negative electrode 12, separator 13, positive electrode 11 and separator 13 . . . separator 13, negative electrode 12. Subsequently, the positive electrode 11, the negative electrode 12 and the separator 13 are pressed and fixed so as to being closely attached to manufacture a battery device 10. For fixing, a fixing member 6 such as an attach tape is used. The fixing member 6 is provided in both side portions of the battery device 10 in a similar manner to the first embodiment shown in FIG. 1B. Thereby, a battery device 10 is formed.

U-shape bending of the positive electrode tab 11C and negative electrode tab 12C, connection of the positive electrode lead 3 and negative electrode lead 4, and packaging of laminate film 2 can be performed in a similar manner to the first embodiment.

In a second embodiment, since gel electrolyte layer and the porous polymer layer 14 containing vinylidene fluoride as a component are formed previously, heating from exterior portion of the laminate film 2 housing a battery device 10 may not be performed. Pressing for closely attaching the gel electrolyte layer, and positive electrode 11 and negative electrode 12 may be performed if necessary.

3. Third Embodiment

In the third embodiment describes a method where the porous polymer layer 14 containing, as a component, vinylidene fluoride on the surface battery device 10 is formed independently, that is to say, is formed without integration into electrolyte. A method for forming a porous polymer layer of third embodiment can be applied to the battery device 10 of any of first embodiment and second embodiment, but a method for forming the battery device 10 of the second embodiment will be described below. Moreover, a method forming the battery device 10 is almost the same as the second embodiment, and discloses a portion forming the porous polymer layer 14 containing as a component vinylidene fluoride will be described.

(3-1) Production Method of Non-aqueous Electrolyte Battery

The aforementioned non-aqueous electrolyte battery can be manufactured by the following process.

Manufacture of Positive Electrode and Negative Electrode

The positive electrode 11 and negative electrode 12 can be manufactured in a similar manner to the second embodiment. The third embodiment does not previously forms a gel electrolyte layer on both faces of the positive electrode 11 and negative electrode 12, and may have a configuration where non-aqueous electrolyte is impregnated into a separator 13. Moreover, gel electrolyte layer may be previously formed on both faces of positive electrode 11 and negative electrode 12. Moreover, a matrix polymer is adhered on both faces of the separator which is faced to the positive electrode 11 and negative electrode 12, non-aqueous electrolyte and a polymer material containing vinylidene fluoride may be reacted to form gel electrolyte layer after sealing the laminate film 2.

Laminate Process

For example, a predetermined number of positive electrode 11 and negative electrode 12 manufactured as described above are assembled and laminated through a rectangular separator 13 so as to have negative electrode 12, separator 13, positive electrode 11, separator 13 . . . separator 13, negative electrode 12. Subsequently the positive electrode 11, the negative electrode 12 and the separator 13 are pressed and fixed so as to being closely attached to manufacture a battery device 10.

The battery device 10 thus manufactured includes U-shape bending of the positive electrode tab 11C and negative electrode tab 12C in a similar manner to the second embodiment.

As the laminate film 2 of the third embodiment, a polymer layer containing vinylidene fluoride is previously formed at the position opposing a battery device 10 on the surface of an inside resin layer 2c. The polymer layer containing vinylidene fluoride is formed by dissolving a polymer material containing vinylidene fluoride in a high polar solvent to obtain a coating solution, which is coated on the predetermined region of the laminate film 2, and by volatilizing and drying a solvent. Examples of the solvents include N-methyl-2-pyrrolidone (NMP), N,N-dimethylacetamide (DMAc), N,N-dimethylformamide (DMF), dimethylsulfoxide (DMSO), acetonitrile, or the like.

The battery device 10 is packaged with the laminate film 2 where a polymer layer containing the vinylidene fluoride is formed on the predetermined region of the inside resin layer 2c. In this time, the battery device 10 is faced to the polymer layer containing the vinylidene fluoride formed in laminate film 2. A non-aqueous electrolyte is injected into a battery before sealing of the laminate film 2. Thereby, the separator 13 impregnates a non-aqueous electrolyte, or afterward a matrix polymer attached on the surface of the separator 13 by heating and pressing a battery from the exterior portion thereof is reacted with a non-aqueous electrolyte to form a gel electrolyte layer on the surface of the separator 13.

In the third embodiment, non-aqueous electrolyte or a gel electrolyte layer containing the non-aqueous electrolyte is present in a battery. Therefore, the polymer layer containing vinylidene fluoride forms a porous polymer layer 14 containing vinylidene fluoride which absorbs a non-aqueous solvent and an electrolyte salt in a battery. Thereby, in a similar manner to the first and second embodiments, motion of a battery device 10 in the laminate film 2 can be suppressed, and reduction of battery properties caused by break of the connection portion of positive electrode lead 3 and negative electrode lead 4 to battery device 10 can be suppressed.

4. Fourth Embodiment

The fourth embodiment describes a battery unit using the aforementioned non-aqueous electrolyte battery 1 and a battery module in combination of these battery units. The fourth embodiment will describe a case of using a non-aqueous electrolyte battery 1 which is drawn from the side which is different from positive electrode lead 3 and negative electrode lead 4 of the first embodiment.

Battery Unit

Figure 10A:
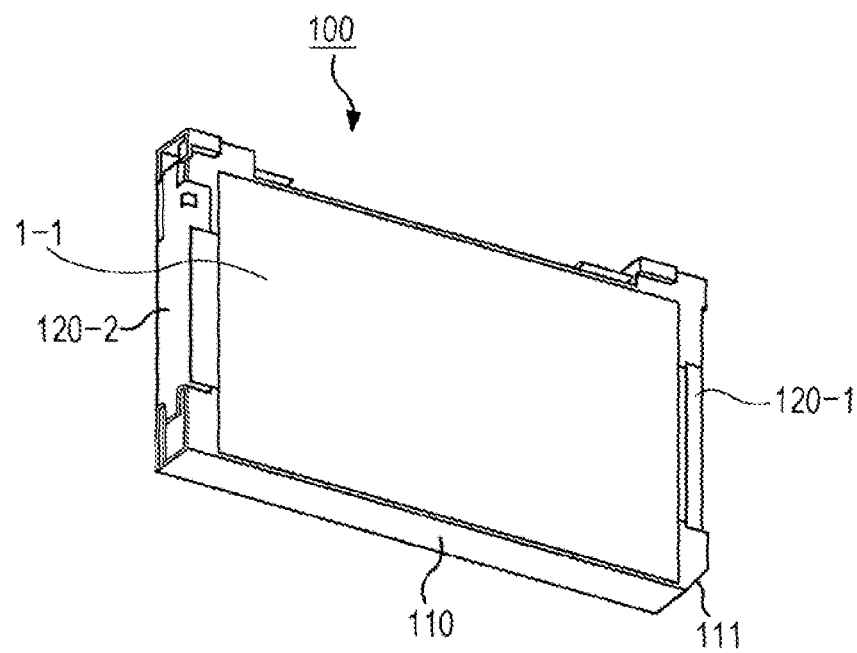
FIGS. 10A and 10B are diagrammatic perspective views illustrating a configuration of a battery unit using a non-aqueous electrolyte battery according to an embodiment of the present disclosure.
Figure 10B:
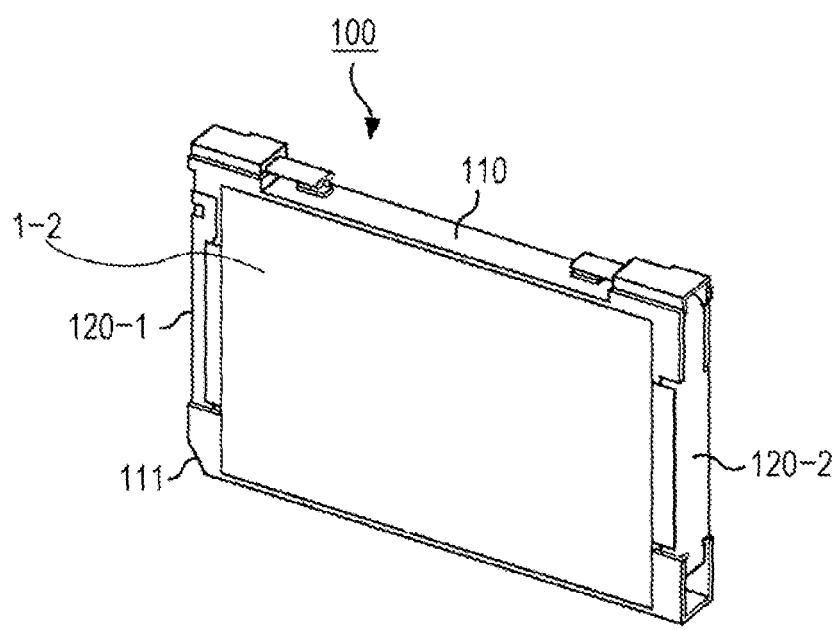

FIGS. 10A and 10B are diagrammatic perspective views illustrating a configuration example of a battery unit which applies an embodiment of the present disclosure. FIGS. 10A and 10B illustrates a battery unit 100 viewed from a different side respectively. FIG. 10A is mainly illustrated as a front face side of the battery unit 100 and FIG. 10B is mainly illustrated as a rear view of battery unit 100. As illustrated in FIG. 10, a battery unit 100 includes non-aqueous electrolyte batteries 1-1 and 1-2, bracket 110, and, bus bars 120-1 and 120-2. The non-aqueous electrolyte batteries 1-1 and 1-2 is a non-aqueous electrolyte battery which uses a configuration of any of first to third embodiments described above.

The bracket 110 is a brace for holding a strength of the non-aqueous electrolyte batteries 1-1 and 1-2. The non-aqueous electrolyte battery 1-1 is mounted on the front face of the bracket 110 and the non-aqueous electrolyte battery 1-2 is mounted on the rear face of the bracket 110. Moreover, the bracket 110 has almost the same shape when being viewed from any of the front and rear faces, but a chamfer 111 is formed in a corner of the lower side, a front face side means that chamfer 111 is at the bottom right and a rear face side means that chamfer 111 is at the bottom left.

The bus bars 120-1 and 120-2 are a metal member having about L-shape, and respectively mounted on both sides of the bracket 110 such that a portion connected to tabs of the non-aqueous electrolyte batteries 1-1 and 1-2 is disposed to the side face of the bracket 110, terminals connected to the exterior portion of the battery unit 100 is disposed on the upper face of the bracket 110.

Figure 11:
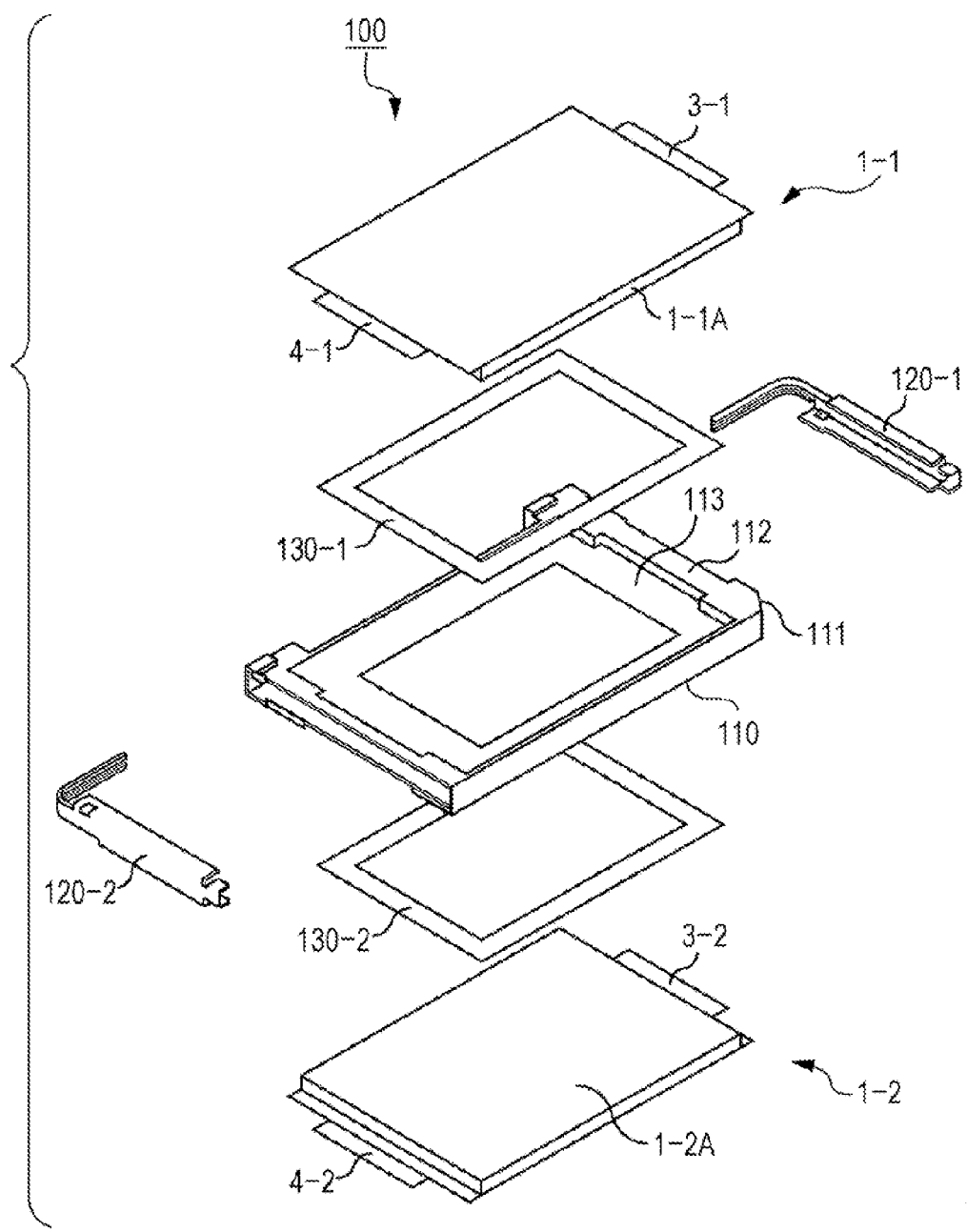
FIG. 11 is an exploded diagrammatic perspective view illustrating a configuration of a battery unit using a non-aqueous electrolyte battery according to an embodiment of the present disclosure.

FIG. 11 is a diagrammatic perspective view illustrating a disassembled state of a battery unit 100. An upper side of FIG. 11 is a front face side of the battery unit 100 and a lower side of FIG. 11 is a rear face side of the battery unit 100. A convex portion where a battery device 10 is housed in the non-aqueous electrolyte battery 1-1 is referred to as a battery main body 1-1A. Similarly, a convex portion where a battery device 10 is housed in the non-aqueous electrolyte battery 1-2 is referred to as a battery main body 1-2A.

The non-aqueous electrolyte batteries 1-1 and 1-2 are mounted on the bracket 110, in which the battery main bodies 1-1A and 1-2A which have convex shapes are faced to each other. That is to say, the non-aqueous electrolyte batteries 1-1 and 1-2 are mounted on the bracket 110, such that a side where the positive electrode lead 3-1 and negative electrode lead 4-1 is provided is directed to a front face side in the non-aqueous electrolyte battery 1-1, and a side where the positive electrode lead 3-2 and negative electrode lead 4-2 are provided is directed to a rear face side in the non-aqueous electrolyte battery 1-2.

The bracket 110 has an periphery wall 112 and a rib portion 113. The periphery wall 112 is slight wider than an outer periphery of the battery main bodies 1-1A and 1-2A of the non-aqueous electrolyte batteries 1-1 and 1-2. That is to say, it is formed so as to surround the battery main bodies 1-1A and 1-2A in which the non-aqueous electrolyte batteries 1-1 and 1-2 are mounted. The rib portion 113 is formed so as to suspend to the inner side of the periphery wall 112 from the central portion in a thickness direction in the side face of the inner side thereof.

In a configuration example of FIG. 11, the non-aqueous electrolyte batteries 1-1 and 1-2 are inserted to the periphery wall 112 from the front and rear face of bracket 110 and both faces in the rib portion 113 of the bracket 110 are stuck by double sided tapes 130-1 and 130-2 having adhesion on both faces. The double sided tapes 130-1 and 130-2 has substantially a frame shape having a certain width and extending along the peripheral end of the non-aqueous electrolyte batteries 1-1 and 1-2, and the rib portion 113 of the bracket 110 may be provided only in area where double sided tapes 130-1 and 130-2 are stuck.

As seen above, the rib portion 113 is formed such that only the predetermined width along the periphery end of the non-aqueous electrolyte batteries 1-1 and 1-2 is suspended to the inner side of the periphery wall 112 from the side face thereof, in which opening is formed in the inner side than the rib portion 113. Therefore, gap occurs by opening portions between the non-aqueous electrolyte battery 1-1 stuck to the rib portion 113 by double sided tape 130-1 from the front face of bracket 110 and the non-aqueous electrolyte battery 1-2 stuck to the rib portion 113 by double sided tape 130-2 from the rear face of bracket 110.

In other words, opening is formed at the central portion of bracket 110, and the non-aqueous electrolyte batteries 1-1 and 1-2 are mounted on the bracket 110 with gap which has the sum of thickness of the rib portion 113 and thickness of double sided tapes 130-1 and 130-2. For example, somewhat swelling caused by charge and discharge or gas generation occurs in the non-aqueous electrolyte batteries 1-1 and 1-2, but a gap formed by the opening portion is a portion which avoids swelling of the non-aqueous electrolyte batteries 1-1 and 1-2. Therefore, an effect where the whole thickness of the battery unit 100 is increased by the portion where the non-aqueous electrolyte batteries 1-1 and 1-2 are swollen, can be excluded.

When the non-aqueous electrolyte batteries 1-1 and 1-2 are adhered to the rib portion 113, a large adhesion area should have high pressure, so that adhesion face of the rib portion 113 is limited to the peripheral end, and thereby can be readily adhered by applying efficient pressure. Thereby, during manufacture, stress applied to the non-aqueous electrolyte batteries 1-1 and 1-2 can be reduced.

As shown in FIG. 11, two non-aqueous electrolyte batteries 1-1 and 1-2 are attached to one bracket 110, which can reduce a thickness and space of the bracket 110, for example, in comparison of a case where one non-aqueous electrolyte battery is attached to one bracket. Thereby, energy density can be improved.

Since a rigidity of thickness direction of battery unit 100 is obtained by synergy sticking two sheets of non-aqueous electrolyte batteries 1-1 and 1-2, the rib portion 113 of the bracket 110 can be thinner. In other words, for example, when a thickness of the rib portion 113 is 1 mm or lower (about thickness limit of resin molding), the non-aqueous electrolyte batteries 1-1 and 1-2 are stuck from both sides of the rib portion 113, a battery unit 100 can obtain a sufficient rigidity as a whole. A thickness of the rib portion 113 is reduced so that a thickness or volume of the battery unit 100 is reduced and, as a result, an energy density of the battery unit 100 can be improved.

Since the battery unit 100 has higher resistance to outer stress, it has a configurations where a peripheral face (both side faces and upper and lower faces) of the non-aqueous electrolyte batteries 1-1 and 1-2 are not contacted to inner face of a peripheral well 112 of the bracket 110; and are stuck to the rib portion 113 in a wide face of the non-aqueous electrolyte batteries 1-1 and 1-2.

By these configuration, the battery unit 100 which has high energy density and strong outer stress can be realized.

Battery Module

With reference to FIGS. 12A to 15B, a configuration example of a battery module 200 in combination of the battery units 100 will be described. The battery module 200 includes a module case 210, a rubber sheet portion 220, a battery portion 230, a battery cover 240, a fixing sheet portion 250, an electrical part portion 260, and a box cover 270.

Figure 12:
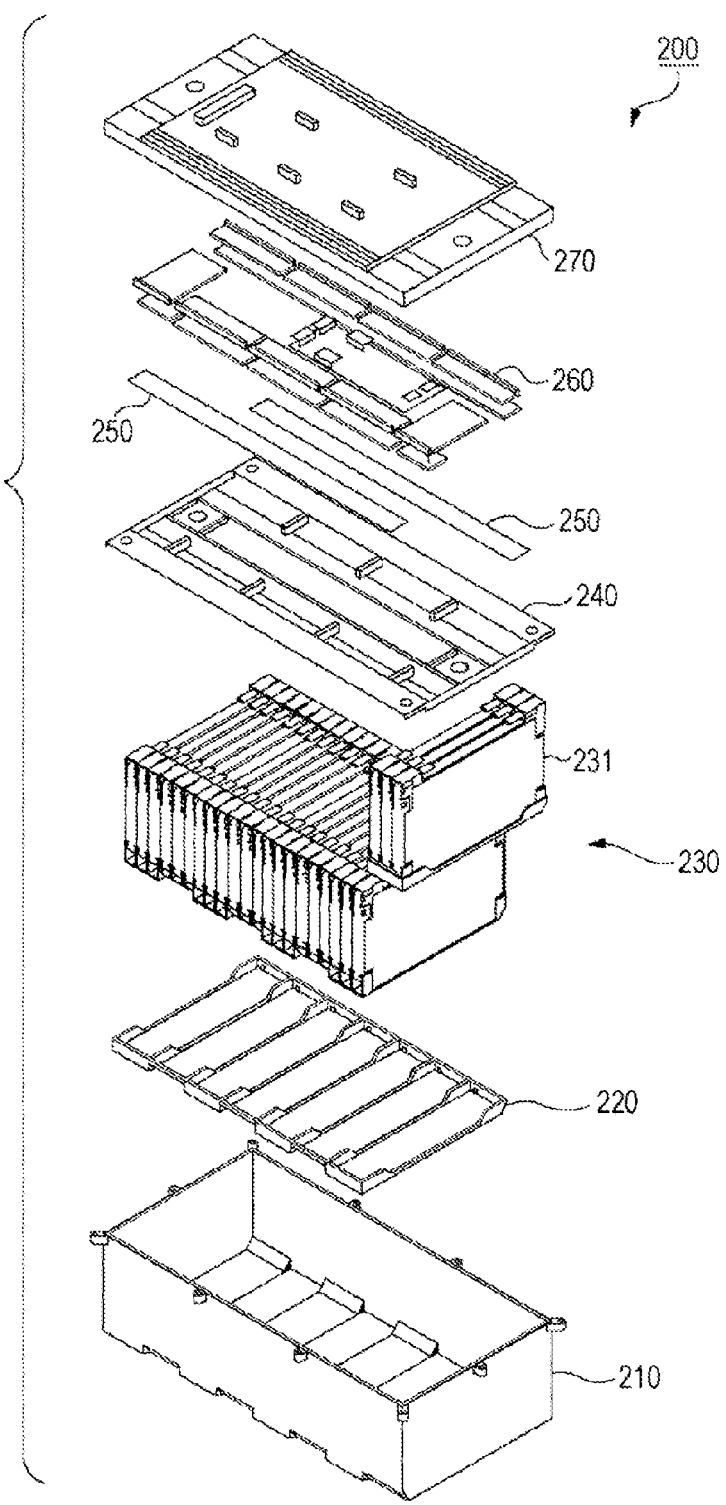
FIG. 12 is a diagrammatic perspective view illustrating a configuration of a battery module using a non-aqueous electrolyte battery according to an embodiment of the present disclosure.

The module case 210 is a case for housing the battery unit 100 and equipping to a using apparatus, in a configuration example of FIG. 12, and has a size capable of housing twenty four battery units 100.

The rubber sheet portion 220 which is laid on the bottom of the battery unit 100 is a sheet for alleviating shock, or the like. In the rubber sheet portion 220, one sheet of the rubber sheet is provided every three battery units 100, and eight sheets of the rubber sheets is prepared for corresponding to the twenty-four battery unit 100.

The battery portion 230 is constructed by combination of twenty-four battery units 100 in a configuration example of FIG. 12. Moreover, the battery portion 230 is constructed such that three battery units 100 in parallel are connected to form a parallel block 231, and eight parallel blocks 231 are connected.

The battery cover 240 is a cover for fixing the battery portion 230, and has opening corresponding to a bus bar 120 of the non-aqueous electrolyte battery 1.

The fixing sheet portion 250 which is disposed on the upper face of the battery cover 240 is a sheet which is closely attached and fixed to the battery cover 240 and box cover 270 when the box cover 270 is fixed to the module case 210.

The electrical parts portion 260 has electrical parts such as a charge and discharge control circuit which controls charge and discharge of the battery unit 100. The charge and discharge control circuit is disposed between bus bars 120 which are arranged in two lines in the battery portion 230.

The box cover 270 is a cover for closing the module case 210 after housing respective portions in the module case 210.

In the battery module 200, the battery portion 230 is constructed such that three battery units 100 are connected in parallel to form a parallel block 231, and the parallel blocks are connected in series. This connection in series is performed in metal plate material of the electrical parts portion 260. Therefore, in the battery portion 230, each of terminals is alternately arranged every parallel block 231, that is to say, parallel block 231 is disposed such that plus terminals and minus terminal are arranged in adjacent parallel blocks 231. The battery module 200 should avoid arrangement of same pole terminals in adjacent parallel block 231.

For example, as shown in FIG. 13, a parallel block 231-1 constructed by battery units 100-1 to 100-3 and a parallel block 231-2 constructed by battery units 100-4 to 100-6 are disposed such that a plus terminal is adjacent to a minus terminal, and is housed in a module case 210. In order to control so as to have such disposition, a chamfer 111 is used, which is formed in one corner portion in a downside of a bracket 110 of a battery unit 100.

Figure 14A:
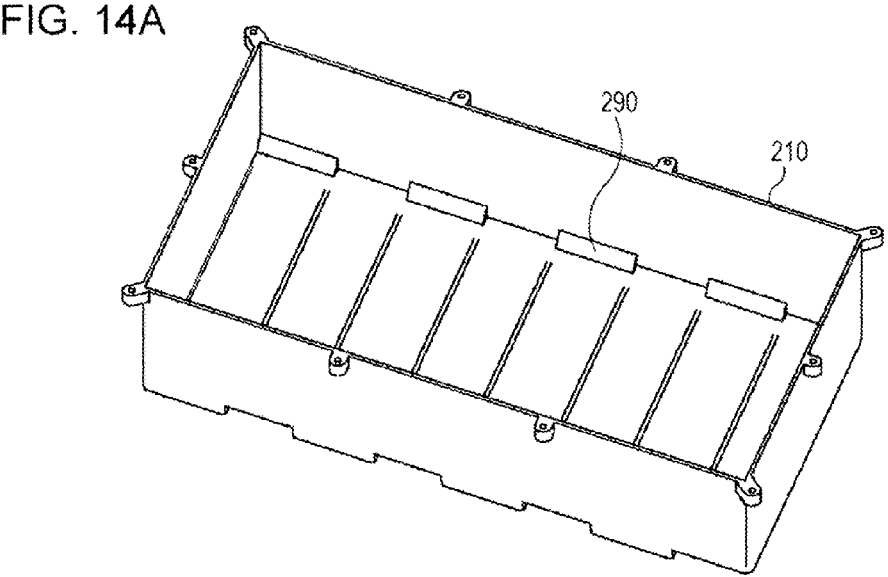
FIGS. 14A and 14B are diagrammatic perspective views illustrating a configuration of a battery module using a non-aqueous electrolyte battery according to an embodiment of the present disclosure.
Figure 14B:
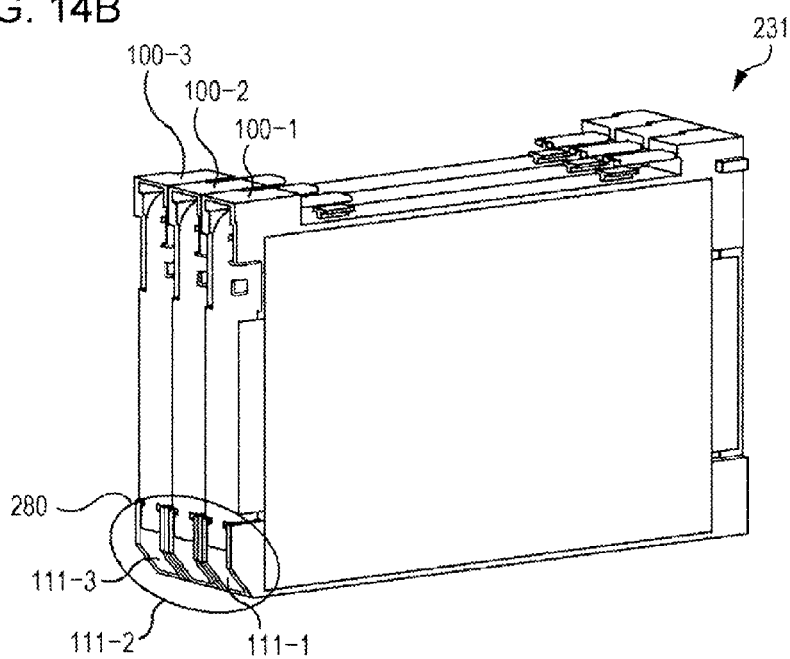
Figure 15A:
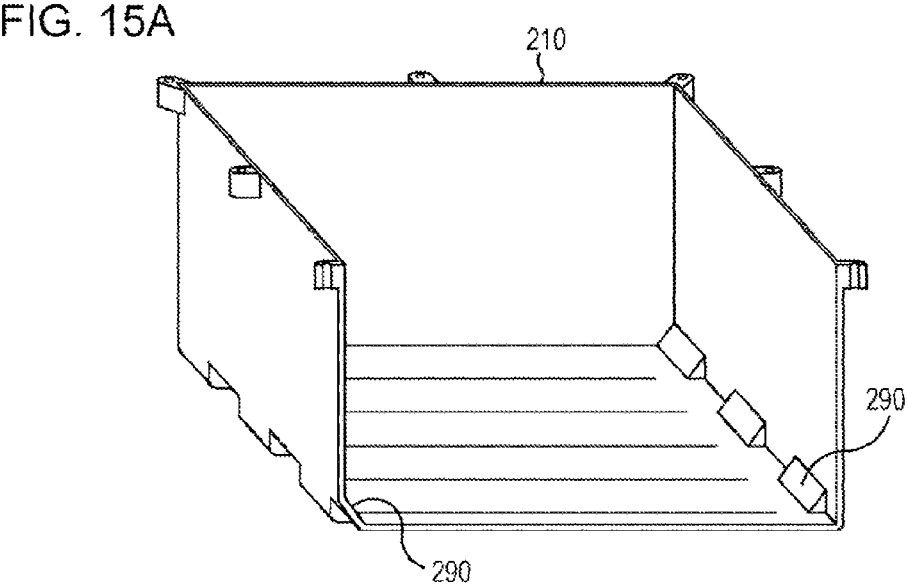
FIGS. 15A and 15B are diagrammatic perspective views illustrating a configuration of a battery module using a non-aqueous electrolyte battery according to an embodiment of the present disclosure.
Figure 15B:
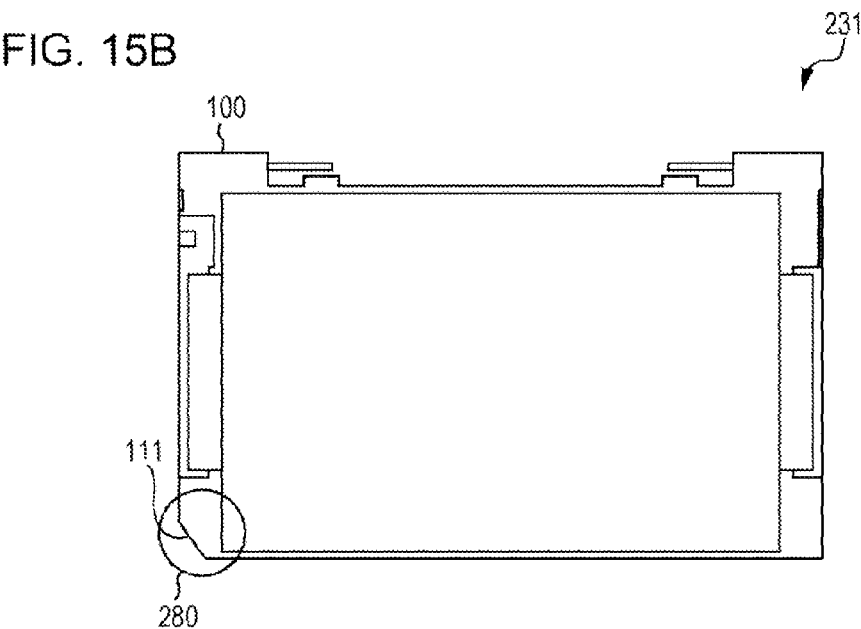

For example, as shown in FIGS. 14A and 15B, in the parallel block 231, battery units 100-1 to 100-3 are combined such that each of chamfers 111-1 to 111-3 is arranged in the same direction, to form a chamfer area 280. The module case 210 includes a tilt portion 290 in response to tilt of the chamfer area 280, in which the tilt portion 290 has a length in response to thickness of three units of the non-aqueous electrolyte battery 1, in which the portions are alternately disposed.

As seen above, in a case where the parallel block 231 is housed in the module case 210 in an error direction by the chamfer area 280 of the parallel block 231 and the tilt portion 290 of the module case 210, the corner in the bottom of the parallel block 231 is contacted to the tilt portion 290 of the module case 210. In this case, since the parallel block 231 is floated from the bottom of the module case 210, the parallel block 231 is not completely housed in the module case 210. Thereby, in the battery module 200, adjacent arrange of same pole terminals is avoided in adjacent parallel blocks 231.

The present disclose has a configuration of the battery unit and battery module using the non-aqueous electrolyte battery according to an embodiment of the present disclose thus obtained. The present disclose is not limited to the aforementioned embodiments, various modification can be performed based on technical idea of the present disclosure.

5. Other Embodiments

There is an example of methods of forming the porous polymer layer containing, as a component vinylidene fluoride and configuration of the battery device which are described in the first to third embodiments, which is not limited thereto.

For example, the outermost layer of the first embodiment is a separator 13, the outermost layer of the second embodiment is a negative electrode 12, but the outermost layer of the first embodiment may use any electrode of positive electrode 11 and negative electrode 12, the outermost layer of the second embodiment may use a separator 13. In a case where the outermost layer uses a separator or an electrode, it may use any of a method where previously a polymer material containing vinylidene fluoride is attached to the outermost layer, then which is reacted with a non-aqueous electrolyte to form a porous polymer layer; or a method where previously a porous polymer layer is formed by coating, followed by lamination; after lamination of electrode and separator, a method where a porous polymer layer is formed by coating on the surface of battery device 10; a method where a porous polymer layer containing, as a component, vinylidene fluoride is formed on the surface of battery device 10.

The porous polymer layer containing, as a component, vinylidene fluoride is coated and formed on the surface of battery device 10 in a similar manner to the second embodiment, a separator 13 between positive electrode 11 and negative electrode 12 may impregnate non-aqueous electrolyte.

Figure 16A:
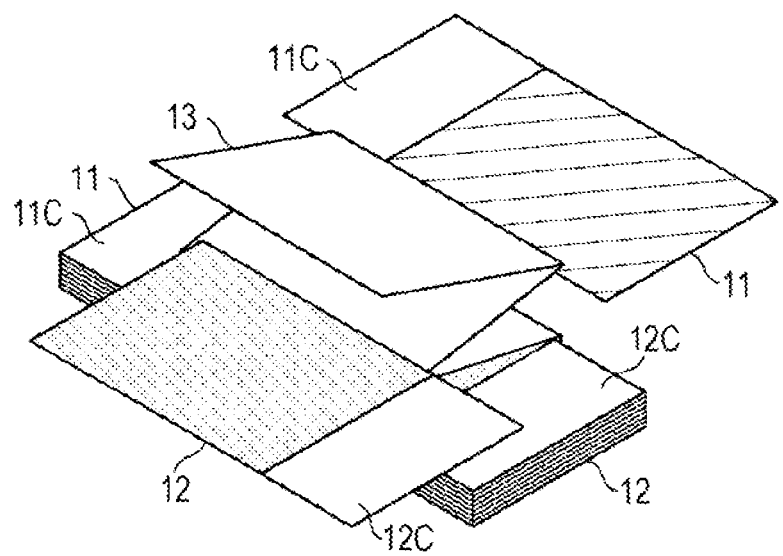
FIGS. 16A and 16B are a diagrammatic perspective view and cross-sectional view illustrating a configuration of another battery device using a non-aqueous electrolyte battery according to an embodiment of the present disclosure.
Figure 16B:
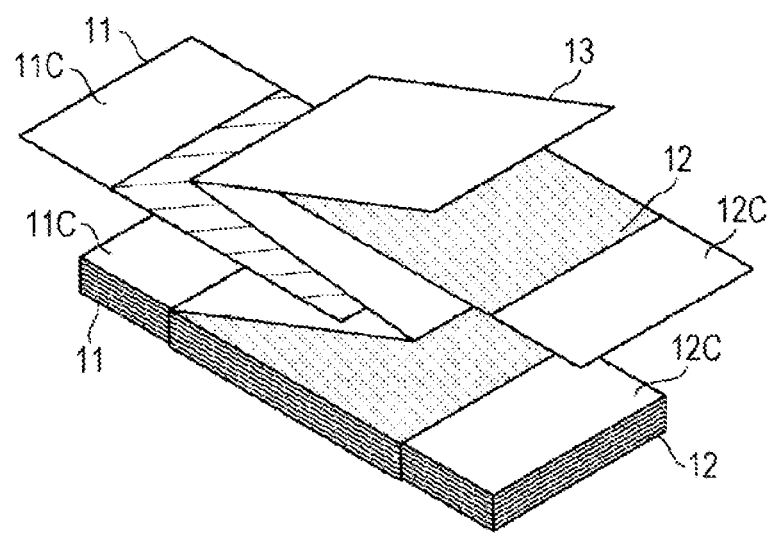
Figure 17A:
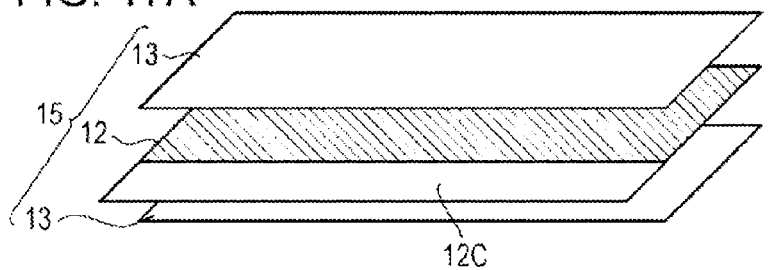
FIGS. 17A to 17C are a diagrammatic perspective view and cross-sectional view illustrating a configuration of another battery device using a non-aqueous electrolyte battery according to an embodiment of the present disclosure.
Figure 17B:
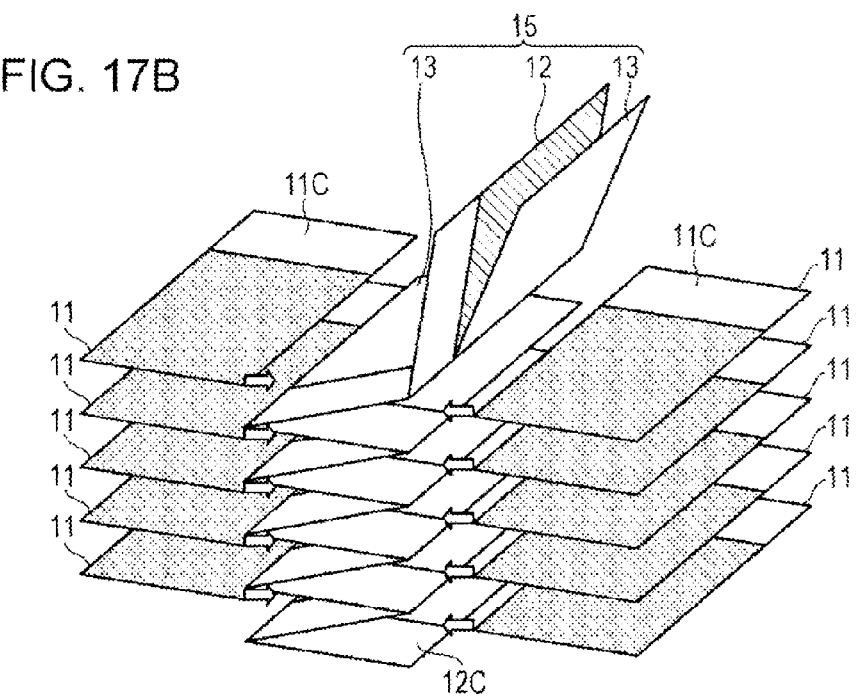
Figure 17C:
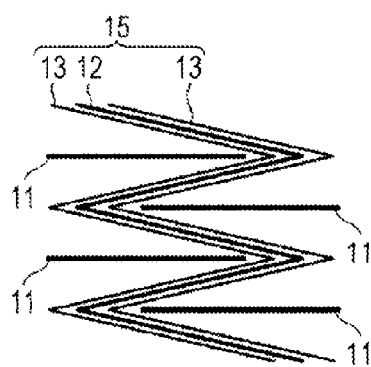

The battery device 10 may use a configuration of FIG. 16B where bending direction of a separator 13 is changed, in addition to, for example, configuration of the first embodiment illustrated in FIG. 16A. The positive electrode tab 11C and negative electrode tab 12C are lower than half width of electrode, and the positive electrode tab 11C and negative electrode tab 12C may be suspended in same direction. Moreover, configuration of battery device 10 may use a rolled electrode structure which rolls belt-shape positive electrode and negative electrode which are laminated through a separator.

The battery module 200 which combines the non-aqueous electrolyte batteries 1 and non-aqueous electrolyte battery 1 of an embodiment of the present disclosure can be used in electrical tools, electrical vehicles or hybrid electrical vehicles and electric power assisted bicycle, a capacitor system for house and building, or the like.

The present disclosure will be described in detail with respect to Examples. The present disclosure is not limited to only Examples.

EXAMPLE 1

In Example 1, a thickness after heat welding in the drawn portion of the positive electrode lead and negative electrode lead is varied to manufacture a non-aqueous electrolyte secondary battery and confirm battery properties.

EXAMPLE 1-1

Manufacture of Positive Electrode

Ninety-seven parts by weight of lithium phosphate compound (LiFePO$_4$) having an olefin structure coated with carbon and 3 parts by weight of carbon black are mixed to form a second mixed material, which is subjected to dry mixing using a bole mill for ten hours.

Then, the second mixed material mixed using a bole mill was fired at the presence of nitrogen (N2) atmosphere at 550° C. Thereby, lithium phosphate compound (LiFePO$_4$) having an olefin structure coated with carbon was obtained as a positive electrode active material.

Subsequently, ninety-five parts by weight of the resultant positive electrode active material, 1 part by weight of graphite as the conducting agent, and 4 parts by weight of polyvinylidene fluoride as a binder are mixed to form a positive electrode mixture, which is dispersed into N-methyl-2-pyrrolidone as a dispersion medium to form a positive electrode mixed slurry. Subsequently, the positive electrode mixed slurry was uniformly coated on both faces of a positive electrode collector of an aluminum (Al) foil having a thickness of 15 μm, and dried, followed by press and molding by a roll pressing machine to form a positive electrode active material layer, and a positive electrode sheet was manufactured. Moreover, in this time, a portion of the positive electrode collector was exposed to manufacture a positive electrode active material layer. Finally, the positive electrode sheet was cut into a predetermined size, to manufacture a positive electrode where the positive electrode collector exposing portion was formed in one side of the rectangular sheet.

Manufacture of the Negative Electrode

Pulverized graphite powder was prepared as a negative electrode active material. Ninety-two parts by weight of the graphite powder and eight parts by weight of polyvinylidene fluoride as a binder were mixed to prepare a negative electrode mixture, further, which is dispersed in N-methyl-2-pyrrolidone as a dispersion medium to a form a negative electrode mixed slurry. Then, the negative electrode mixed slurry was uniformly coated on both faces of a negative electrode collector of an copper (Cu) foil having a thickness of 12 μm, and dried, followed by press and molding by a roll pressing machine to form a negative electrode active material layer, and a positive electrode sheet was manufactured. Moreover, in this time, a portion of the negative electrode collector was exposed to manufacture a negative electrode active material layer. Finally, the negative electrode sheet was cut into a predetermined size, to manufacture a negative electrode where the negative electrode collector exposing portion was formed in any one side of the rectangular sheet.

Manufacture of Separator Forming Polymer on the Surface

Polyvinylidene fluoride (PVdF) polymer having a weight-average molecular weight of 1,000,000 was dissolved in N-methyl-2-pyrrolidone solution so as to have a concentration of 8% by weight to prepare a polymer solution, which was coated on both faces of a separator of porous polyethylene film having a thickness of 16 μm with a coating apparatus. Subsequently, the polyethylene film where the polymer solution was coated was immersed in a de-ion water, followed by drying, and a polymer layer of porous polyvinylidene fluoride having a thickness of 3 μm was manufactured on both faces of polyethylene film.

Assembly of Non-Aqueous Electrolyte Battery

The positive electrode and negative electrode manufactured as described above are laminated through the separator where a polymer of a porous polyvinylidene fluoride was formed to manufacture a battery device. In this time, the separator was bent in a zigzag shape, the positive electrodes and negative electrodes are inserted in an order between wrinkles of the separator with a zigzag shape, and thereby the positive electrodes and negative electrodes are laminated through the separator. In this time, the positive electrode and negative electrode were inserted such that the outermost layer is a porous polymer layer formed on the separator. Subsequently, the positive electrode, negative electrode and separator are fixed by a protective tape so as not to be mismatched to obtain a battery device.

Moreover, the manufactured battery device was wedged between packaging materials, and three sides excluding one side were heat welded. The packaging material used an aluminum film with moisture resistance where a nylon film having a thickness of 25 μm, an aluminum foil having a thickness of 40 μm and a polypropylene film having a thickness of 30 μm were laminated from the outermost layer. Subsequently, non-aqueous electrolyte was injected from an opening of one side which was not subjected to heat welding, the one side was heat welded and sealed at the presence of reducing pressure. Finally, the battery device packaged by the laminate film was disposed between iron plates and heated for 90° C. at 3 minutes, and thereby the separator were adhered to positive electrode and negative electrode through the porous polymer layer. Therefore, a non-aqueous electrolyte battery having a capacitance of 10 Ah and a thickness of 8.0 mm was manufactured.

EXAMPLE 1-2

A non-aqueous electrolyte battery was manufactured in a similar manner to Example 1-1, except that a copolymer obtained by copolymerizing ninety parts by weight of vinylidene fluoride and ten parts by weight of hexafluoropropylene was used as a polymer which was dissolved in N-methyl-2-pyrrolidone solution.

EXAMPLE 1-3

A non-aqueous electrolyte battery was manufactured in a similar manner to Example 1-1, except that a copolymer obtained by copolymerizing ninety-seven parts by weight of vinylidene fluoride, four parts by weight of hexafluoropropylene and three parts by weight of chlorotrifluoroethylene was used as a polymer which was dissolved in N-methyl-2-pyrrolidone solution.

EXAMPLE 1-4

A non-aqueous electrolyte battery was manufactured in a similar manner to Example 1-1, except that a copolymer obtained by copolymerizing 99.5 parts by weight of vinylidene fluoride and 0.5 parts by weight of monomethyl maleate was used as a polymer which was dissolved in N-methyl-2-pyrrolidone solution.

EXAMPLE 1-5

A non-aqueous electrolyte battery was manufactured in a similar manner to Example 1-1, except that a separator where a porous polymer layer was formed only at the end portion thereof, that is to say, the outermost layer which was disposed between a negative electrode and a laminate film, and the porous polymer layer is not formed other than the outermost layer.

COMPARATIVE EXAMPLE 1-1

A non-aqueous electrolyte battery was manufactured in a similar manner to Example 1-1, except that a separator where porous polymer layer was not formed was used.

COMPARATIVE EXAMPLE 1-2

A non-aqueous electrolyte battery was manufactured in a similar manner to Example 1-1, except that methyl methacrylate was used as a polymer which was dissolved in N-methyl-2-pyrrolidone solution.

COMPARATIVE EXAMPLE 1-3

A non-aqueous electrolyte battery was manufactured in a similar manner to Example 1-1, except that polyvinyl alcohol was used as a polymer which was dissolved in N-methyl-2-pyrrolidone solution.

Evaluation of Non-Aqueous Electrolyte Battery
(a) Measurement of Discharge Capacity With respect to non-aqueous electrolyte battery of the aforementioned Examples and Comparative Examples, charge was performed at a constant current of 2 A to 3.6V at the circumstance of 23° C., and subsequently, charge was performed at a constant voltage of 3.6V for the total charging time of 7 hours. Then, discharge was performed at a constant current of 2 A to a final voltage of 2.0V to obtain first cycle discharge capacity. Test for 20 non-aqueous electrolyte batteries were performed with respect to respective Examples and Comparative Examples and average values thereof were shown in Table 1.

(b) Vibration Test

With respect to non-aqueous electrolyte battery of the aforementioned Examples and Comparative Examples, the non-aqueous electrolyte battery after the first cycle discharge capacity was obtained was charged to 3.6V. Then, vibration tests were performed for 90 minutes at conditions of amplitude of 0.8 mm, frequency of 10 to 55 Hz, and cleaning rate of 1 Hz/minute in each of tri-axial directions (x-axis, y-axis, z-axis), and then internal resistance (1 kHz) was measured. Test for 20 non-aqueous electrolyte batteries were performed with respect to respective Examples and Comparative Examples and average values thereof were shown in Table 1.

The aforementioned evaluation results are shown in Table 1.

TABLE 1

|  | | Surface layer | | First cycle | |
| --- | --- | --- | --- | --- | --- |
|  | Substrate | Polymer | One face thickness [μm] | discharge capacity [Ah] | Internal resistance [mΩ] |
| Example 1-1 | PE | Polyvinylidene fluoride | 3 | 10.28 | 9.6 |
| Example 1-2 | | VdF-HFP copolymer | | 10.25 | 9.5 |
| Example 1-3 | | VdF-HFP-CTFE copolymer | | 10.21 | 9.3 |
| Example 1-4 | | VdF-MME copolymer | | 10.31 | 9.8 |
| Example 1-5 | | Polyvinylidene fluoride | | 10.28 | 9.9 |
| Comparative Example 1-1 | PE | — | — | 10.19 | 16.1 |
| Comparative Example 1-2 | | Methyl methacrylate | 3 | 10.25 | 15.2 |
| Comparative Example 1-3 | | Polyvinyl alcohol | | 10.23 | 14.6 |

As seen from table 1, Examples 1-1 to 1-5 where a polymer layer containing, as a component, porous polyvinylidene fluoride was formed between the battery device and packaging material have an internal resistance of 10 mΩ or lower and does reduce first cycle discharge capacity. In Example 1-5 where a polymer layer containing, as a component, porous polyvinylidene fluoride was formed only between the surface of the battery device and the separator, increase of the internal resistance was not almost seen.

In this regard, each of Comparative Example 1-1 using a separator where the polymer layer was not formed and Comparative and Examples 1-2 and 1-3 using a separator where a polymer layer not containing, as a component, polyvinylidene fluoride was formed has an internal resistance of 14.6 to 16.1mΩ, and therefore a prominent increase thereof is confirmed.

That is to say, according to a polymer layer containing, as a component, porous polyvinylidene fluoride formed between the exterior face of the battery device and packaging material, it ca see that increase of internal resistance can be suppressed when vibration is applied.

EXAMPLE 2

In Example 2, a thickness of a polymer layer containing, as a component, porous polyvinylidene fluoride formed on the surface of a separator is varied to manufacture a non-aqueous electrolyte secondary battery and confirm battery properties.

EXAMPLE 2-1

A non-aqueous electrolyte battery was manufactured in a similar manner to Example 1-1, except that a thickness of a porous polyvinylidene fluoride polymer layer was 5 μm.

EXAMPLE 2-2

A non-aqueous electrolyte battery was manufactured in a similar manner to Example 1-1, except that a thickness of a porous polyvinylidene fluoride polymer layer was 3 μm.

EXAMPLE 2-3

A non-aqueous electrolyte battery was manufactured in a similar manner to Example 1-1, except that a thickness of a porous polyvinylidene fluoride polymer layer was 1 μm.

EXAMPLE 2-4

A non-aqueous electrolyte battery was manufactured in a similar manner to Example 1-1, except that a thickness of a porous polyvinylidene fluoride polymer layer was 0.5 μm.

COMPARATIVE EXAMPLE 2-1

A non-aqueous electrolyte battery was manufactured in a similar manner to Example 1-1, except that a separator where a porous polyvinylidene fluoride polymer layer was not formed was used Evaluation of Non-Aqueous Electrolyte Battery (a) Measurement of Discharge Capacity and (b) Vibration Test Measurement of discharge capacity and vibration test were performed in a similar manner to Example 1 with respect to the non-aqueous electrolyte batteries of Examples and Comparative Examples.

The aforementioned evaluation results are shown in Table 2.

TABLE 2

| | | Surface layer | | | First cycle | |
| --- | --- | --- | --- | --- | --- | --- |
| | Substrate | Polymer | Weight-average molecular weight | One face thickness [μm] | discharge capacity [Ah] | Internal resistance [mΩ] |
| Example 2-1 | PE | Polyvinylidene fluoride | 1,000,000 | 5 | 10.15 | 9.9 |
| Example 2-2 | | | | 3 | 10.28 | 9.6 |
| Example 2-3 | | | | 1 | 10.31 | 9.2 |
| Example 2-4 | | | | 0.5 | 10.29 | 11.3 |
| Comparative Example 2-1 | PE | — | — | — | 10.19 | 16.1 |

As seen from Table 2, Examples 2-1 to 2-4 where a porous polyvinylidene fluoride polymer layer was formed between the outer face of the battery device and a packaging material have high first cycle discharge capacity and low internal resistance, in comparison of Comparison Example 2-1 using a separator where porous polyvinylidene fluoride polymer layer was not formed. In particular, it ca see that Examples 2-1 to 2-3 where a thickness of the porous polyvinylidene fluoride polymer layer is 1 μm or higher has a lower internal resistance than Example 2-4 where a thickness of the porous polyvinylidene fluoride polymer layer is 0.5 μm. Moreover, when a thickness of the porous polyvinylidene fluoride polymer layer is 1 μm or higher, a predominant reduction of internal resistance was not seen.

EXAMPLE 3

In Example 3, a weight-average molecular weight of polyvinylidene fluoride used for porous polyvinylidene fluoride polymer layer is varied to manufacture a non-aqueous electrolyte secondary battery and confirm battery properties.

EXAMPLE 3-1

A non-aqueous electrolyte battery was manufactured in a similar manner to Example 1-1, except that a weight-average molecular weight of polyvinylidene fluoride was 400,000.

EXAMPLE 3-2

A non-aqueous electrolyte battery was manufactured in a similar manner to Example 1-1, except that a weight-average molecular weight of polyvinylidene fluoride was 500,000.

EXAMPLE 3-3

A non-aqueous electrolyte battery was manufactured in a similar manner to Example 1-1, except that a weight-average molecular weight of polyvinylidene fluoride was 800,000.

EXAMPLE 3-4

A non-aqueous electrolyte battery was manufactured in a similar manner to Example 1-1, except that a weight-average molecular weight of polyvinylidene fluoride was 1,000,000.

EXAMPLE 3-5

A non-aqueous electrolyte battery was manufactured in a similar manner to Example 1-1, except that a weight-average molecular weight of polyvinylidene fluoride was 1,500,000.

EXAMPLE 3-6

A non-aqueous electrolyte battery was manufactured in a similar manner to Example 1-1, except that a weight-average molecular weight of polyvinylidene fluoride was 1,800,000.

COMPARATIVE EXAMPLE 3-1

A non-aqueous electrolyte battery was manufactured in a similar manner to Example 1-1, except that a separator where a porous polyvinylidene fluoride polymer layer was not formed was used.
Evaluation of Non-Aqueous Electrolyte Battery
(a) Measurement of Discharge Capacity and (b) Vibration Test Measurement of discharge capacity and vibration test were performed in a similar manner to Example 1 with respect to the non-aqueous electrolyte batteries of Examples and Comparative Examples.

The aforementioned evaluation results are shown in Table 3.

TABLE 3

|  | | Surface layer | | | |
| --- | --- | --- | --- | --- | --- |
|  | Substrate | Polymer | Weight-average molecular weight | One face thickness [μm] | First cycle discharge capacity [Ah] | Internal resistance [mΩ] |
| Example 3-1 | PE | Polyvinylidene fluoride | 400000 | 3 | 10.25 | 11.1 |
| Example 3-2 | | | 500000 | | 10.30 | 9.1 |
| Example 3-3 | | | 800000 | | 10.20 | 9.2 |
| Example 3-4 | | | 1000000 | | 10.28 | 9.6 |
| Example 3-5 | | | 1500000 | | 10.16 | 9.9 |
| Example 3-6 | | | 1800000 | | 10.14 | 11.7 |
| Comparative Example 3-1 | PE | — | — | — | 10.19 | 16.1 |

As seen from Table 3, Example 3-1 where a weight-average molecular weight of polyvinylidene fluoride which was used for forming the polyvinylidene fluoride polymer layer in the separator was 400,000, and Example 3-6 where a weight-average molecular weight of polyvinylidene fluoride was 1,800,000 have an inter resistance of 11.1 to 11.7 mΩ. Whereas, Examples 3-2 to 3-5 where a weight-average molecular weight of polyvinylidene fluoride was in the range of 500,000 to 1,500,000 have an internal resistance of 10 mΩ or lower, which is prominently improved.

That is to say, in a case where a weight-average molecular weight of polyvinylidene fluoride which was used for forming a porous polyvinylidene fluoride polymer layer between the outer face of the battery device and a packaging material is in the range of 500,000 to 1,500,000, it ca see high effect where increase of internal resistance can be suppressed when vibration was applied.

EXAMPLE 4

In Example 4, a porous polyvinylidene fluoride polymer layer mixed with inorganic oxide particles was formed to confirm battery properties.

EXAMPLE 4-1

A non-aqueous electrolyte battery was manufactured in a similar manner to Example 1-1.

EXAMPLE 4-2

Alumina ($Al_2O_3$) having an average particle size of 0.5 μm was used as inorganic oxide particles. A porous polyvinylidene fluoride polymer layer containing inorganic oxide particles was formed as follows.

A polyvinylidene fluoride (PVdF) polymer having a weight-average molecular weight of 1,000,000 was dissolved in N-methyl-2-pyrrolidone solution to a concentration of 8% by weight to prepare a polymer solution. The aforementioned alumina fine powder was added to the polymer solution so as to have twice in terms of an amount of polyvinylidene fluoride added, followed by sufficiently stirring.

The alumina-added polymer solution was coated on both faces of a separator of micro-porous polyethylene film having a thickness of 16 μm with a coating apparatus. Then, the polymer solution-coated polyethylene film was immersed in a de-ionized water, followed by drying, a polymer layer of porous polyvinylidene fluoride having a thickness of 3 μm was manufactured on both faces of polyethylene film.

EXAMPLE 4-3

A non-aqueous electrolyte battery was manufactured in a similar manner to Example 4-2, except that silica($SiO_2$) having an average particle size of 0.5 μm was used as inorganic oxide particles.

EXAMPLE 4-4

A non-aqueous electrolyte battery was manufactured in a similar manner to Example 4-2, except that titania($TiO_2$) having an average particle size of 0.5 μm was used as inorganic oxide particles.
Evaluation of Non-Aqueous Electrolyte Battery
(a) Measurement of Discharge Capacity and (b) Vibration Test Measurement of discharge capacity and vibration test were performed in a similar manner to Example 1 with respect to the non-aqueous electrolyte batteries of Examples and Comparative Examples.

The aforementioned evaluation results are shown in Table 4.

TABLE 4

| | | Surface layer | | | | | |
|---|---|---|---|---|---|---|---|
| | Substrate | Polymer | Weight-average molecular weight | Inorganic oxide | One face thickness [μm] | First cycle discharge capacity [Ah] | Internal resistance [mΩ] |
| Example 4-1 | PE | Polyvinylidene fluoride | 1000000 | — | 3 | 10.28 | 9.6 |
| Example 4-2 | | | | $Al_2O_3$ | | 10.14 | 8.7 |
| Example 4-3 | | | | $SiO_2$ | | 10.17 | 8.9 |
| Example 4-4 | | | | $TiO_2$ | | 10.14 | 8.8 |
| Comparative Example 4-1 | PE | — | | — | — | 10.19 | 16.1 |

As seen from Table 4, it ca see that Examples 4-2 to 4-4 where inorganic oxide particles were mixed with a porous polyvinylidene fluoride polymer between the outer face of the battery device and a packaging material have a lower internal resistance than Example 4-1 where inorganic oxide particle was not mixed. Therefore, it is preferable that inorganic oxide particles were mixed with a porous polyvinylidene fluoride polymer between the outer face of the battery device and a packaging material.

An embodiment of the present disclosure was described specifically, but the present disclosure is not limited to the aforementioned embodiments, and various modifications can be made based on the technical idea.

For example, aforementioned embodiment discloses laminate type electrodes where a positive electrode and negative electrode are laminated are used as a battery; or so called zigzag type electrodes bent in a zigzag shape was used without rolling as a battery, but the present disclosure is not limited thereto, a belt-type positive electrode and belt-type negative are laminated through a separator, an electrode rolled in a longitudinal direction can be applied.

The present disclosure contains subject matter related to that disclosed in Japanese Priority Patent Application JP 2010-257348 filed in the Japan Patent Office on Nov. 17, 2010, the entire contents of which are hereby incorporated by reference.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:

1. A non-aqueous electrolyte battery, comprising:
a battery device comprising a positive electrode, a negative electrode, and a separator formed between the positive electrode and the negative electrode;
a non-aqueous electrolyte;
a laminate film housing the non-aqueous electrolyte and the battery device, the laminate film comprising a metal layer, an outside resin layer formed on an outer face of the metal layer, and an inside resin layer formed on the metal layer;
a positive electrode lead electrically connected to the positive electrode and drawn through a portion of the laminate film to an exterior thereof;
a negative electrode lead electrically connected to the negative electrode and drawn through a portion of the laminate film to an exterior thereof; and
a porous polymer layer formed between the laminate film and the battery device and containing vinylidene fluoride as a component,
wherein the porous polymer layer comprises a non-aqueous solvent, wherein the porous polymer layer has a weight-average molecular weight of equal to or more than 500,000 and equal to or lower than 1,500,000,
wherein the porous polymer layer is a copolymer containing, as a repetition unit, at least one of polyvinylidene fluoride (PVdF), vinylidene fluoride (VdF), hexafluoropropylene (HFP), trifluoroethylene (TFE) and chlorotrifluoroethylene (CTFE),
wherein a thickness of the porous polymer layer is equal to or more than 1.0 μm and equal to or lower than 5.0 μm,
wherein the porous polymer layer contains inorganic particles, wherein the inorganic particles are selected from the group consisting of alumina ($Al_2O_3$), magnesia (MgO), titania ($TiO_2$), zirconia ($ZrO_2$), silica ($SiO_2$), silicon nitride ($Si_3N_4$), aluminum nitride (AlN), boron nitride (BN), titanium nitride (TiN), silicon carbide (SiC), boron carbide ($B_4C$), and a combination thereof, and
wherein the porous polymer layer is integrally formed with and entirely covers both opposed faces of the separator.

2. The non-aqueous electrolyte battery according to claim 1, wherein the inside resin layer of the laminate film is roughened.

3. The non-aqueous electrolyte battery according to claim 1, wherein the positive electrode and the negative electrode of the battery device are alternately laminated through a separator such that the separator is the outermost layer.

4. The non-aqueous electrolyte battery according to claim 1, wherein a discharge capacity of the battery is equal to or more than 3 Ah and equal or less than 50 Ah and thickness is equal to or higher than 5 mm and equal to or lower than 20 mm.

5. The non-aqueous electrolyte battery according to claim 1, wherein the non-aqueous electrolyte is a gel electrolyte.

6. The non-aqueous electrolyte battery according to claim 1, wherein the porous layer consists of the non-aqueous solvent, an electrolyte salt and a copolymer containing the vinylidene fluoride component and at least one other monomer component.

7. The non-aqueous electrolyte battery according to claim 1, comprising a positive electrode lead and a negative electrode lead, wherein a thickness of at least one of the positive electrode lead and the negative electrode lead ranges from 150 μm to 250 μm.

8. The non-aqueous electrolyte battery according to claim 1, wherein the outside resin layer has a higher melting point than that of the inside resin layer.

9. The non-aqueous electrolyte battery according to claim 8, wherein the outside resin layer is selected from a group consisting of polyolefine-based resin, polyimide-based resin, polyethylene naphthalate (PEN) and polybutylene naphthalate (PBN).

10. The non-aqueous electrolyte battery according to claim 1, wherein a separator is bent in a zigzag shape and the positive electrode and the negative electrode are alternately laminated through the separator.

11. The non-aqueous electrolyte battery according to claim 1, wherein the copolymer contains hexafluoropropylene (HFP).

12. The non-aqueous electrolyte battery according to claim 1, wherein the copolymer contains trifluoroethylene (TFE).

13. The non-aqueous electrolyte battery according to claim 1, wherein the copolymer contains chlorotrifluoroethylene (CTFE).

14. The non-aqueous electrolyte battery according to claim 1, wherein the copolymer is selected from the group consisting of a copolymer containing polyvinylidene fluoride (PVdF), vinylidene fluoride (VdF), and hexafluoropropylene (HFP) as a repetition unit, and a copolymer containing, vinylidene fluoride (VdF), hexafluoropropylene (HFP), and chlorotrifluoroethylene (CTFE) as a repetition unit.

15. The non-aqueous electrolyte battery according to claim 1, wherein the laminate film further comprises an adhesion layer between the outside resin layer and the metal layer, and an adhesion layer between the inside resin layer and the metal layer, with both adhesion layers having a thickness of equal to or higher than 2 μm and equal to or lower than 7 μm.

16. The non-aqueous electrolyte battery according to claim 1, wherein the negative electrode has an active material layer, wherein the active material layer CoSnC-containing materials containing tin (Sn), cobalt (Co) and carbon (C) as configuration elements, in which the content of carbon (C) is in the range of equal to or more than 9.9% by mass and equal to or less than 29.7% by mass, a ratio (Co/(Sn+Co)) of cobalt (Co) to the sum of tin (Sn) and cobalt (Co) is in the range of equal to or more than 30% by mass and equal to or less than 70% by mass.

17. A non-aqueous electrolyte battery, comprising:
a battery device comprising a positive electrode, a negative electrode, and a separator formed between the positive electrode and the negative electrode;
a non-aqueous electrolyte;
a laminate film enclosing the non-aqueous electrolyte and the battery device, the laminate film comprising a metal layer having a thickness of 30 μm to 150 μm, an outside resin layer formed on an outer face of the metal layer and having a thickness of 25 μm to 35 μm, and an inside resin layer formed on the metal layer and having a thickness of 20 μm to 50 μm;
a positive electrode lead electrically connected to the positive electrode and drawn through a portion of the laminate film to an exterior thereof;
a negative electrode lead electrically connected to the negative electrode and drawn through a portion of the laminate film to an exterior thereof; and
a porous polymer layer formed between the laminate film and the battery device and containing vinylidene fluoride as a component,
wherein the porous polymer layer comprises a non-aqueous solvent,
wherein the porous polymer layer has a weight-average molecular weight of equal to or more than 500,000 and equal to or lower than 1,500,000,
wherein the porous polymer layer is a copolymer containing, as a repetition unit, at least one of polyvinylidene fluoride (PVdF), vinylidene fluoride (VdF), hexafluoropropylene (HFP), trifluoroethylene (TFE) and chlorotrifluoroethylene (CTFE),
wherein a thickness of the porous polymer layer is equal to or more than 1.0 μm and equal to or lower than 5.0 μm,
wherein the porous polymer layer contains inorganic particles, wherein the inorganic particles are selected from the group consisting of alumina ($Al_2O_3$), magnesia (MgO), titania ($TiO_2$), zirconia ($ZrO_2$), silica ($SiO_2$), silicon nitride ($Si_3N_4$), aluminum nitride (AlN), boron nitride (BN), titanium nitride (TiN), silicon carbide (SiC), boron carbide ($B_4C$), and a combination thereof, and
wherein the porous polymer layer is integrally formed with and entirely covers both opposed faces of the separator.

18. The non-aqueous electrolyte battery according to claim 17, wherein a separator is bent in a zigzag shape and the positive electrode and the negative electrode are alternately laminated through the separator.

* * * * *